(12) United States Patent
Hurst et al.

(10) Patent No.: US 11,313,476 B1
(45) Date of Patent: *Apr. 26, 2022

(54) PRESSURE LOSS MITIGATION AND DURABLE VALVE

(71) Applicant: Colt Irrigation, LLC, Santa Barbara, CA (US)

(72) Inventors: William E. Hurst, Goleta, CA (US); James Walter Hurst, Goleta, CA (US)

(73) Assignee: Colt Irrigation, LLC, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/180,424

(22) Filed: Feb. 19, 2021

Related U.S. Application Data

(63) Continuation of application No. 16/998,903, filed on Aug. 20, 2020, now Pat. No. 10,927,962.

(60) Provisional application No. 62/986,277, filed on Mar. 6, 2020, provisional application No. 62/890,521, filed on Aug. 22, 2019.

(51) Int. Cl.
| | |
|---|---|
| *F16K 31/04* | (2006.01) |
| *F16K 3/04* | (2006.01) |
| *F16K 27/02* | (2006.01) |
| *F16K 31/54* | (2006.01) |
| *F16K 3/18* | (2006.01) |
| *F16K 3/02* | (2006.01) |

(52) U.S. Cl.
CPC .............. *F16K 3/04* (2013.01); *F16K 3/0218* (2013.01); *F16K 3/188* (2013.01); *F16K 27/029* (2013.01); *F16K 31/047* (2013.01); *F16K 31/54* (2013.01)

(58) Field of Classification Search
CPC ... F16K 3/04; F16K 3/06; F16K 31/04; F16K 31/047; F16K 31/535; F16K 31/54
USPC ........................................ 251/175, 196, 301
See application file for complete search history.

(56) References Cited

U.S. PATENT DOCUMENTS

| | | | | |
|---|---|---|---|---|
| 316,913 | A ‡ | 4/1885 | Prunty ..................... | F16K 39/04 137/630.12 |
| 921,209 | A ‡ | 5/1909 | Demarest ................. | F16K 7/16 251/284 |
| 993,693 | A ‡ | 5/1911 | La Londe et al. ...... | F16K 51/02 251/301 |
| 1,548,634 | A ‡ | 8/1925 | Schiller ................. | F16K 39/045 251/175 |

(Continued)

*Primary Examiner* — Robert K Arundale
(74) *Attorney, Agent, or Firm* — Knobbe, Martens, Olson & Bear LLP

(57) ABSTRACT

An irrigation valve comprises a housing including a chamber, a fluid inlet comprising a fluid inlet passage configured to fluidly communicate with a first conduit, wherein the fluid inlet is configured to communicate fluid from the first conduit to the chamber, a fluid outlet comprising a fluid outlet passage configured to fluidly communicate with a second conduit, wherein the fluid outlet is configured to communicate fluid from the chamber to the second conduit, a rigid substrate and a stretchable, compressible and/or flexible membrane on a surface of the rigid substrate, wherein the rigid substrate is configured to be positioned so that the membrane is located between the fluid inlet and the fluid outlet when the valve is in a closed position, and wherein a fluid pressure within the chamber causes the membrane to seal a first orifice of the fluid outlet passage when the valve is in the closed position.

22 Claims, 30 Drawing Sheets

(56) References Cited

U.S. PATENT DOCUMENTS

| | | | | |
|---|---|---|---|---|
| 1,666,531 A ‡ | 4/1928 | Glauber | ............... | F16K 19/00 4/570 |
| 2,022,875 A ‡ | 12/1935 | Zinkil | ............... | F16K 11/0655 251/320 |
| 2,527,050 A ‡ | 10/1950 | Abercrombie | ............ | F16K 3/28 251/327 |
| 2,628,056 A ‡ | 2/1953 | Fuller | ............... | F16K 3/10 251/147 |
| 2,835,468 A ‡ | 5/1958 | Brian | ............... | F16K 31/0658 251/129.15 |
| 3,170,669 A ‡ | 2/1965 | Roos | ............... | F16K 5/184 251/160 |
| 3,202,162 A ‡ | 8/1965 | Eckardt | ............... | F16K 13/06 137/68.13 |
| 3,387,816 A ‡ | 6/1968 | Holycross | ............... | F16K 3/02 251/175 |
| 3,457,950 A ‡ | 7/1969 | Over | ............... | F16K 3/28 137/546 |
| 3,489,389 A ‡ | 1/1970 | Kaatz | ............... | F16K 5/184 251/163 |
| 3,559,947 A ‡ | 2/1971 | Sette | ............... | F16K 3/02 251/147 |
| 3,906,990 A ‡ | 9/1975 | Nelson | ............... | F16K 19/00 137/359 |
| 3,910,554 A ‡ | 10/1975 | Speedie | ............ | B60H 1/00485 251/208 |
| 3,933,339 A ‡ | 1/1976 | Dietzsch | ............... | F16K 3/0254 251/176 |
| 4,161,307 A ‡ | 7/1979 | Clinch | ............... | B60H 1/00 251/193 |
| 4,219,182 A ‡ | 8/1980 | Schneck | ............ | B60H 1/00485 251/176 |
| 4,328,949 A ‡ | 5/1982 | Oddenino | ............ | B60H 1/00485 251/165 |
| 4,484,728 A ‡ | 11/1984 | Moore | ............... | E02B 7/20 251/147 |
| 4,504,266 A ‡ | 3/1985 | Harle | ............... | A61M 1/7413 604/118 |
| 4,671,487 A ‡ | 6/1987 | Bragin | ............... | F16K 3/184 251/204 |
| 6,325,096 B1‡ | 12/2001 | Rising | ............... | G05D 7/0635 137/454.2 |
| 7,051,994 B2‡ | 5/2006 | Carlson | ............... | F16K 3/0245 251/162 |
| 8,397,745 B2‡ | 3/2013 | Hurst | ............... | G05D 7/03 137/119.03 |
| 9,341,281 B2‡ | 5/2016 | Hurst | ............... | F16K 31/385 |
| 9,599,286 B2‡ | 3/2017 | Hurst | ............... | F16K 31/423 |
| 9,841,769 B2‡ | 12/2017 | Hurst | ............... | G05D 7/03 |
| 10,088,849 B2‡ | 10/2018 | Hurst | ............... | F16K 31/385 |
| 10,571,937 B1‡ | 2/2020 | Hurst | ............... | G05D 7/0635 |
| 2009/0084997 A1‡ | 4/2009 | Lee | ............... | F16K 3/06 251/129.01 |
| 2011/0006236 A1‡ | 1/2011 | Williams | ............... | F16K 51/02 251/301 |
| 2016/0033047 A1‡ | 2/2016 | Seo | ............... | F16K 3/188 137/487.5 |

‡ imported from a related application

Figs. 1A-C
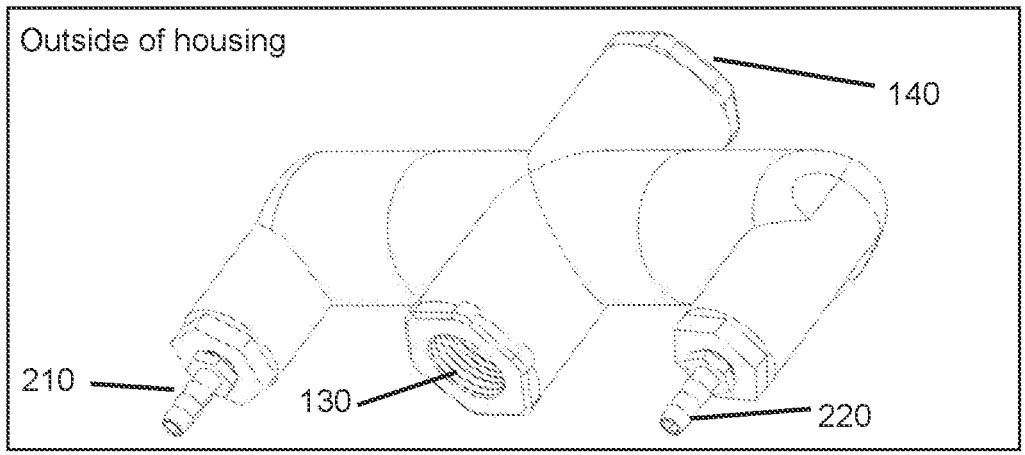
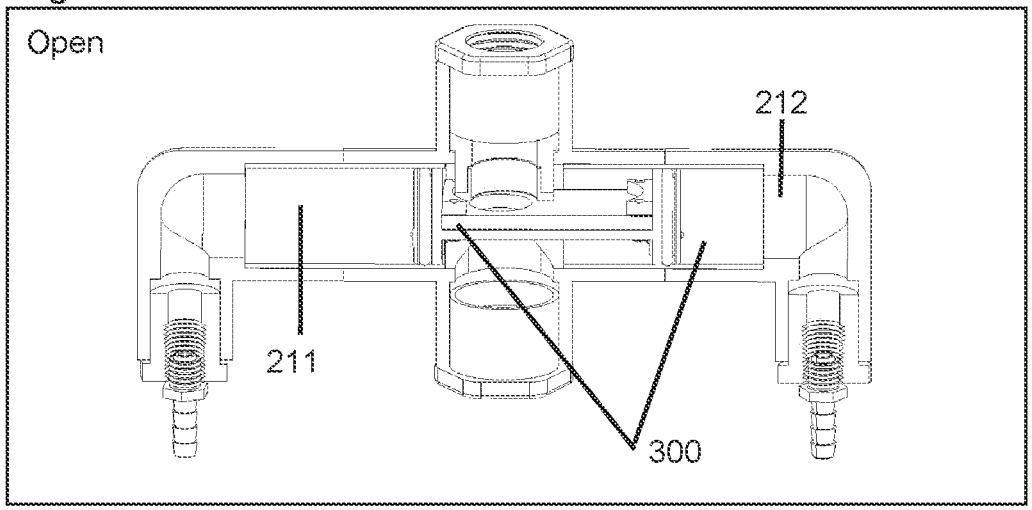
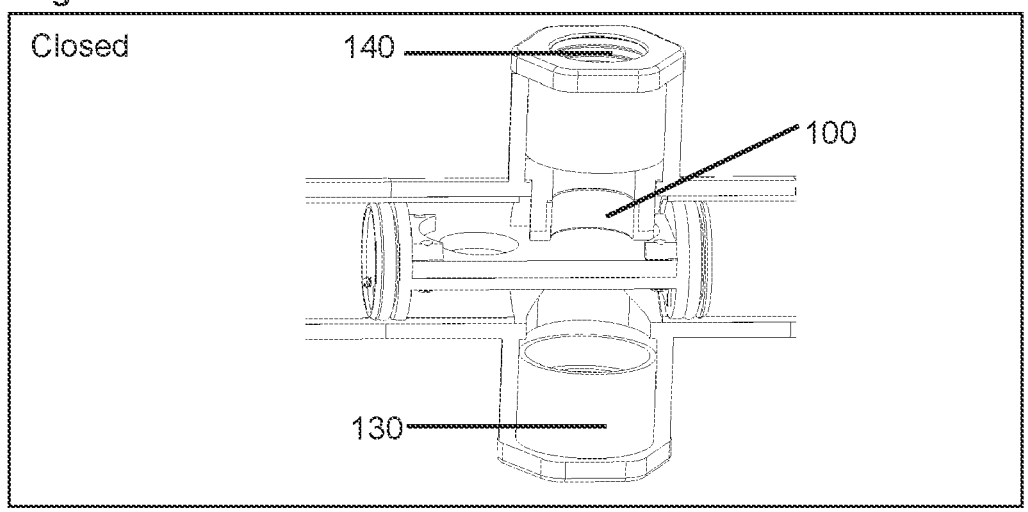

Figs. 1D-F

Figs. 2A-C
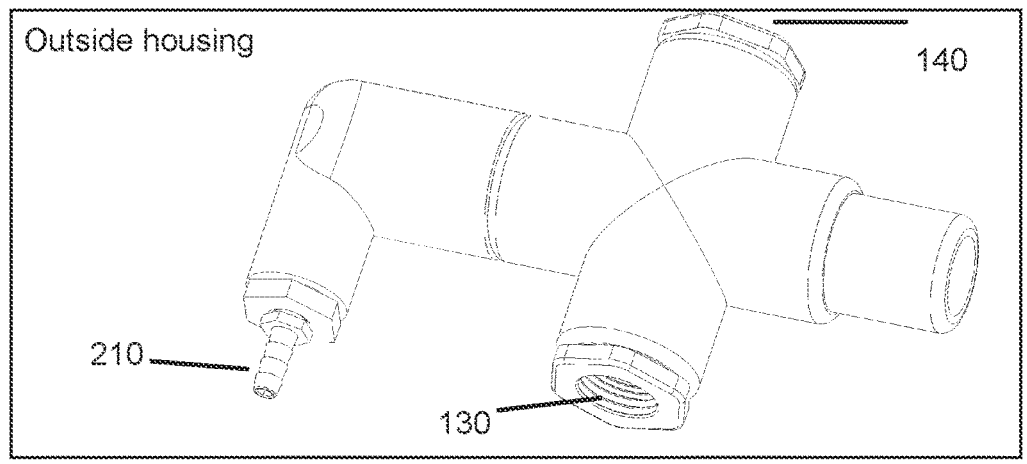
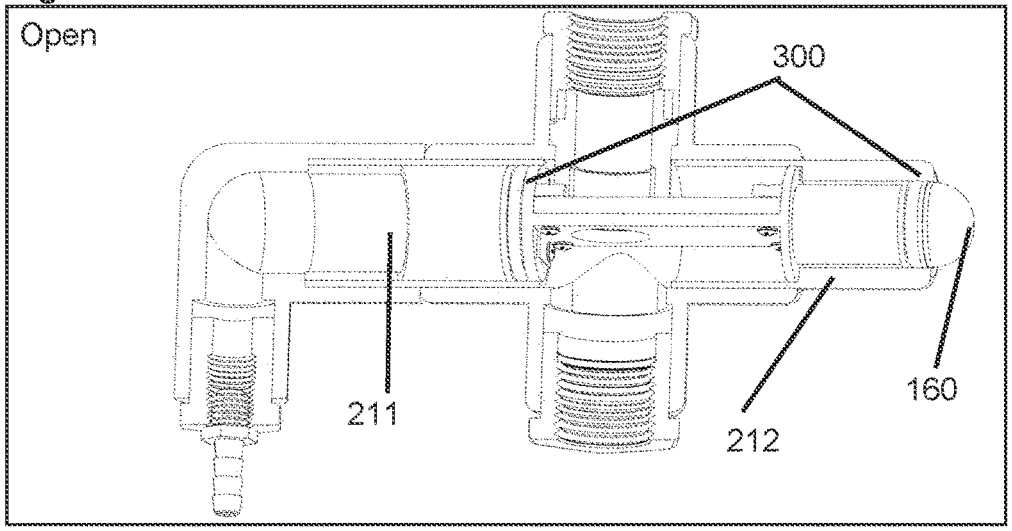
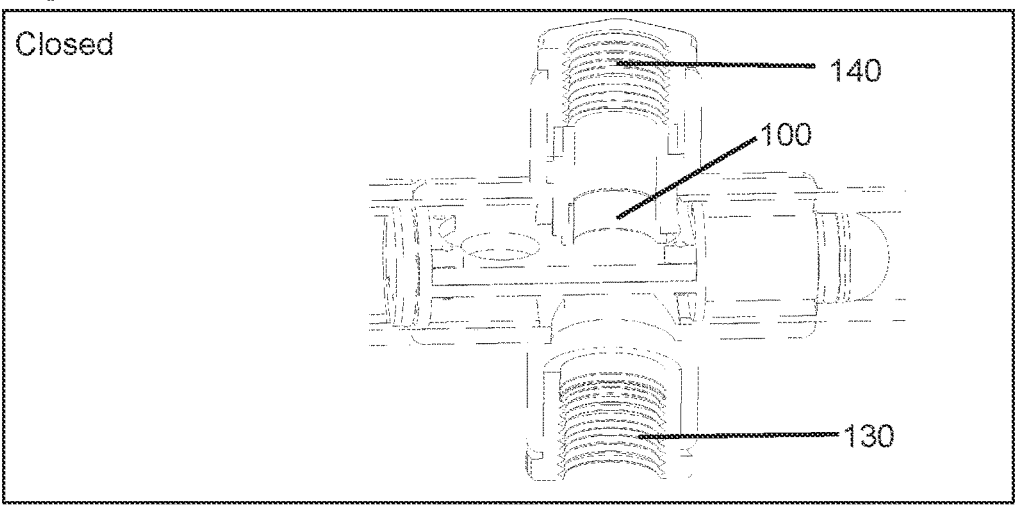

Figs. 3G-H
Fig. 3G Open
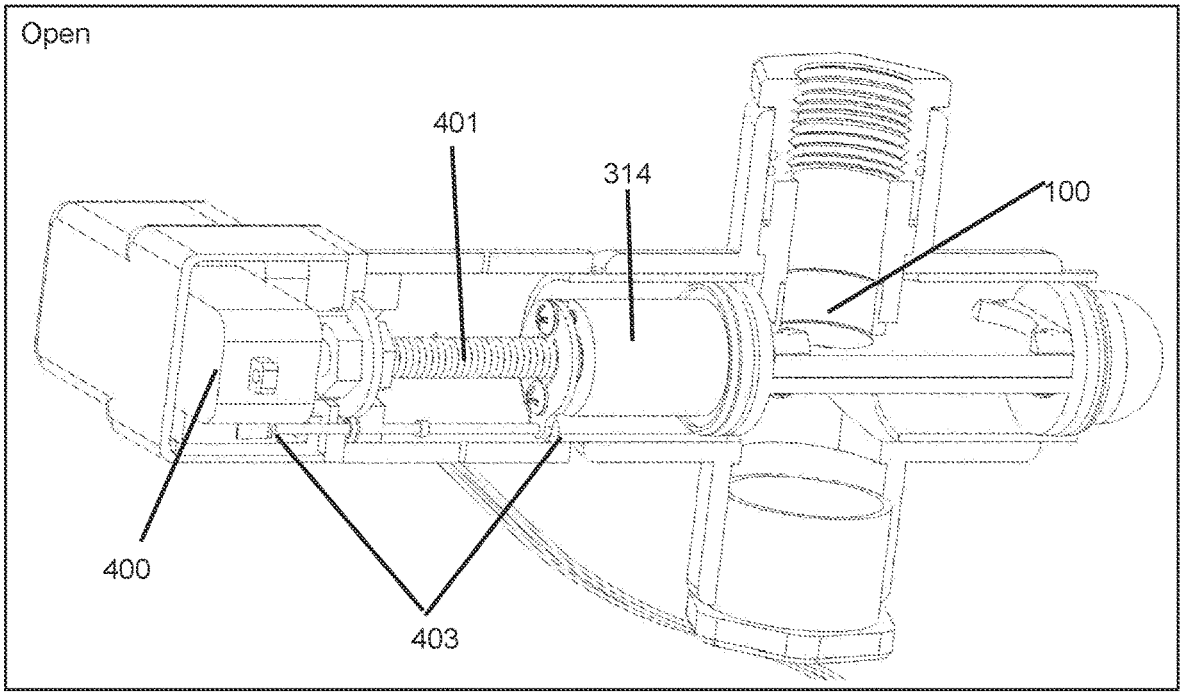
Fig. 3H Closed
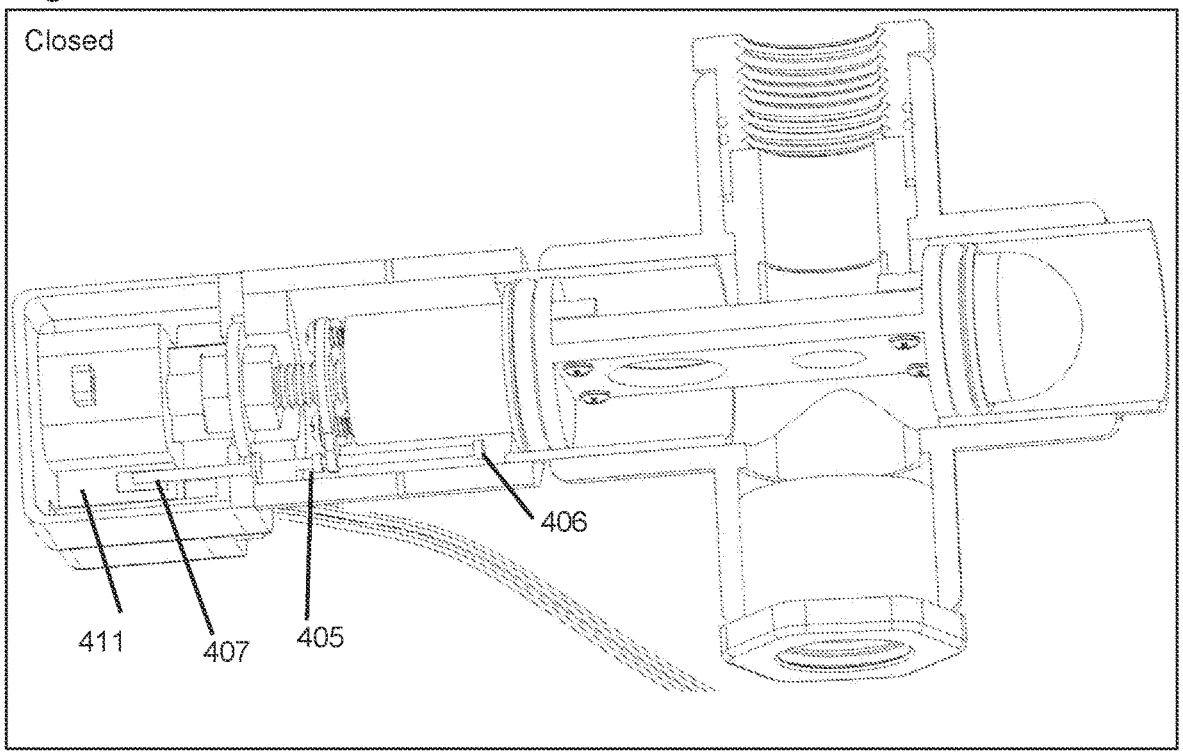

Figs. 4F-G
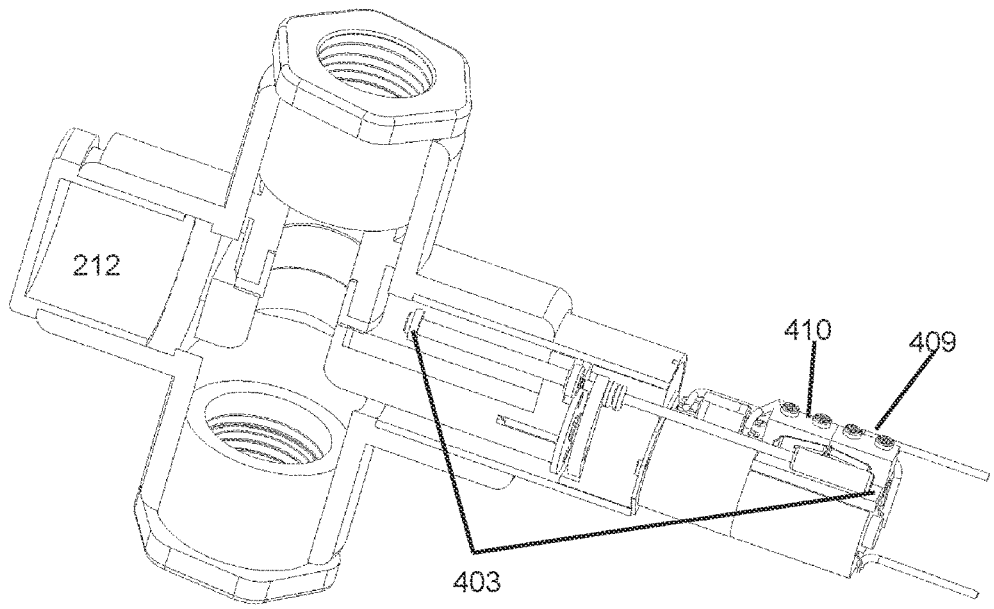
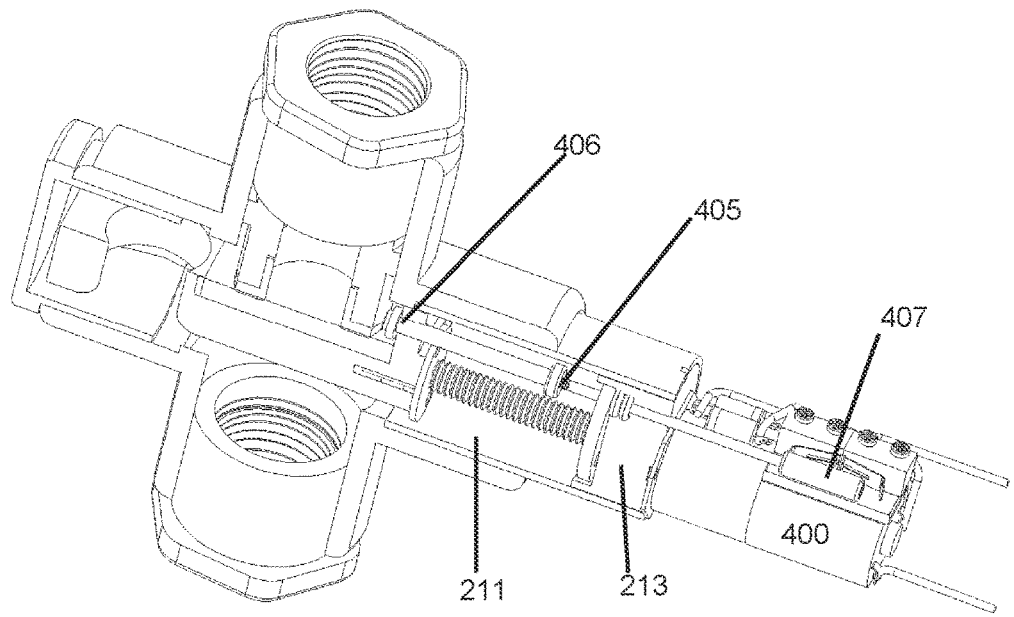

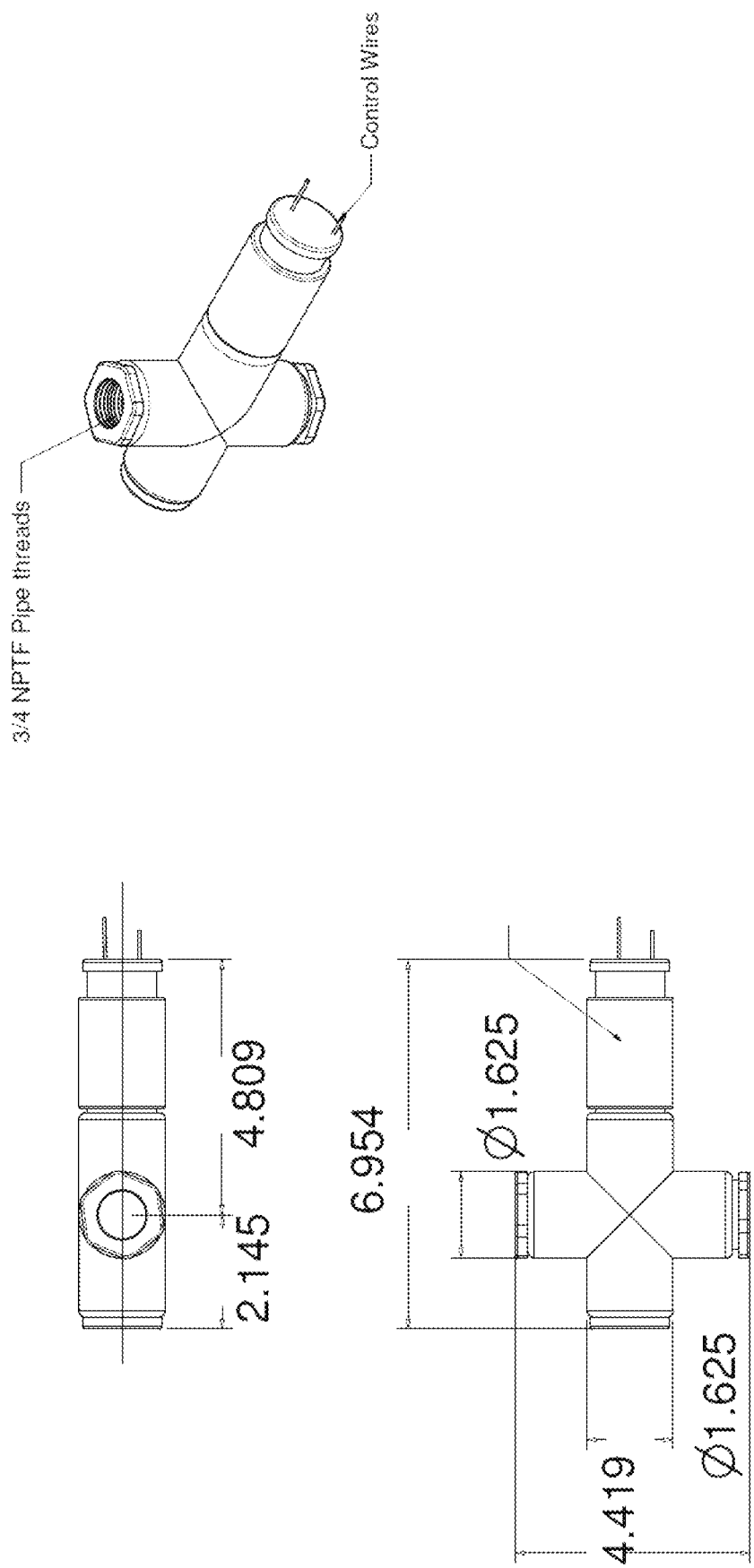

Figs. 5A-C

Outside housing

Open

Closed

Figs. 5D-E

Motorized slide short valve: 3/4" Dimensions

Motorized pivot valve: 3/4" Outside dimensions

Figs. 8A-C
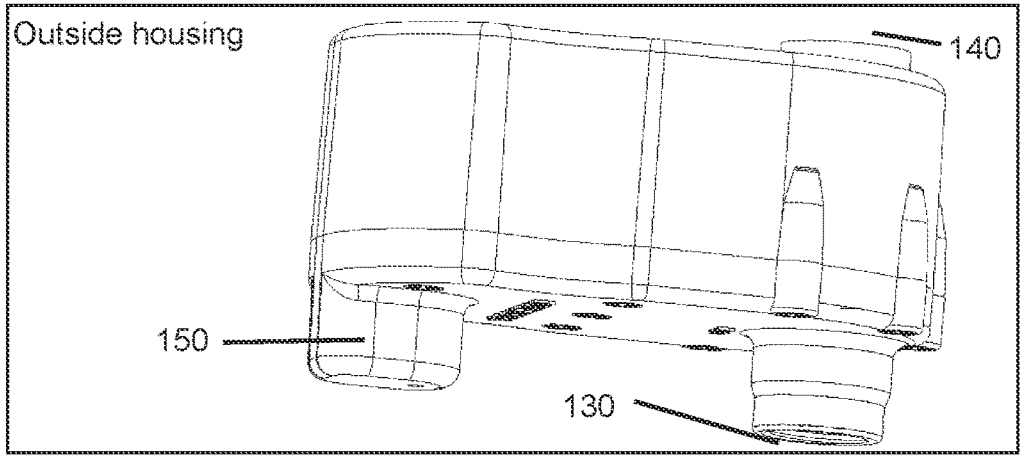
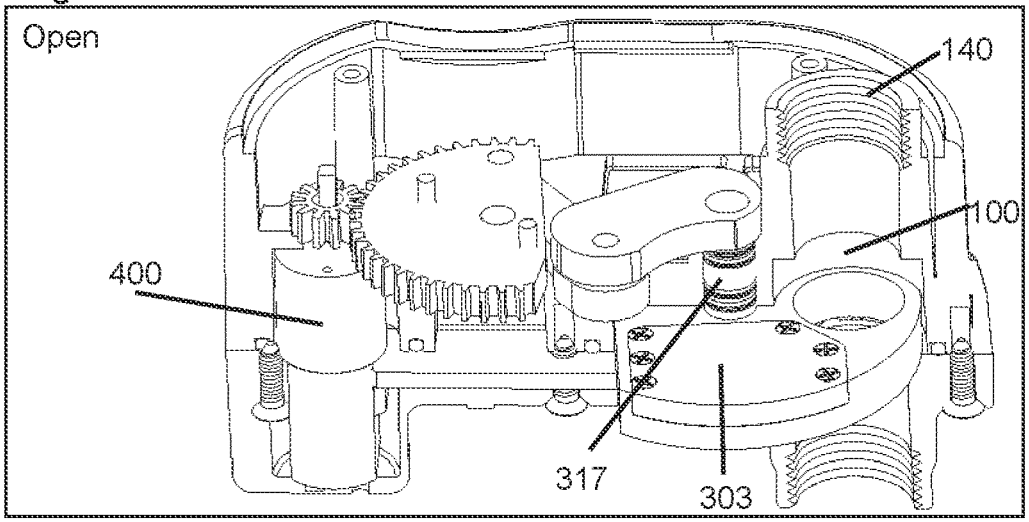
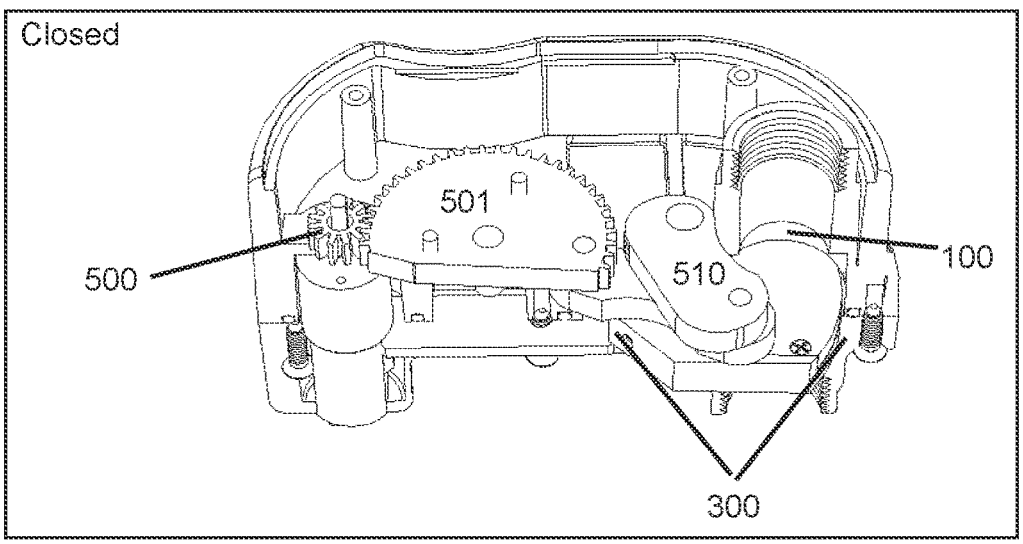

Figs. 8D-F

Figs. 8H-J
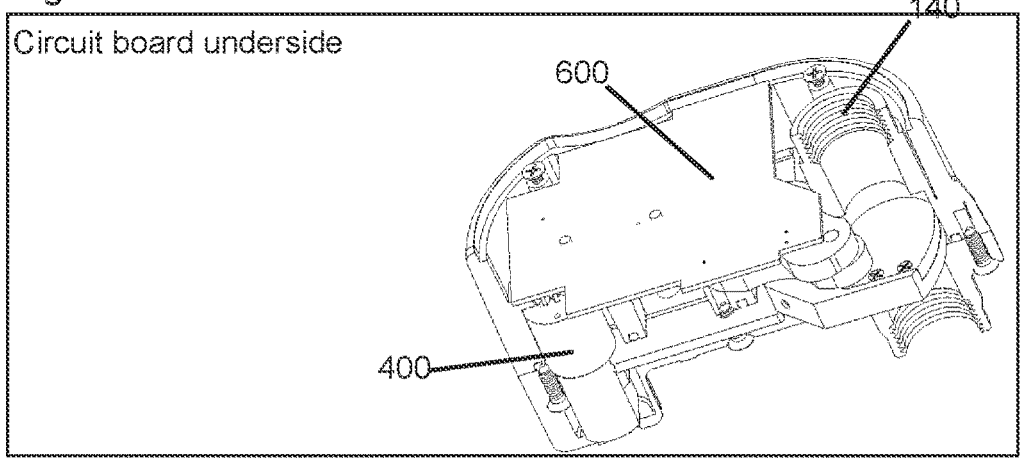
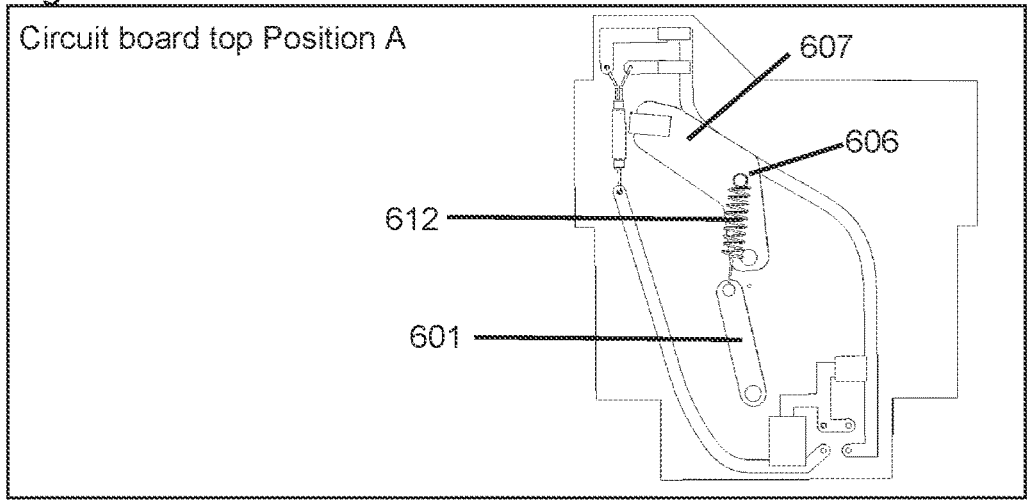
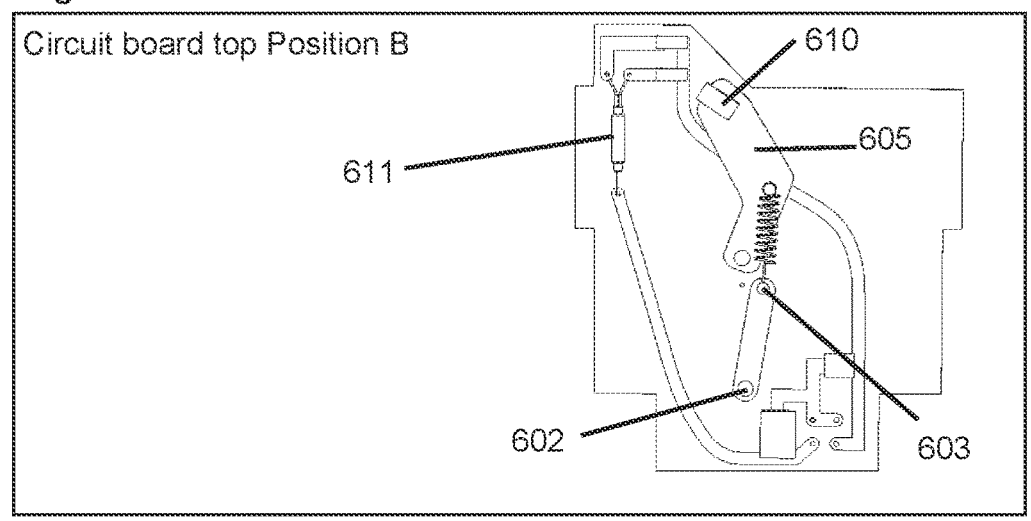

Figs. 8M-N

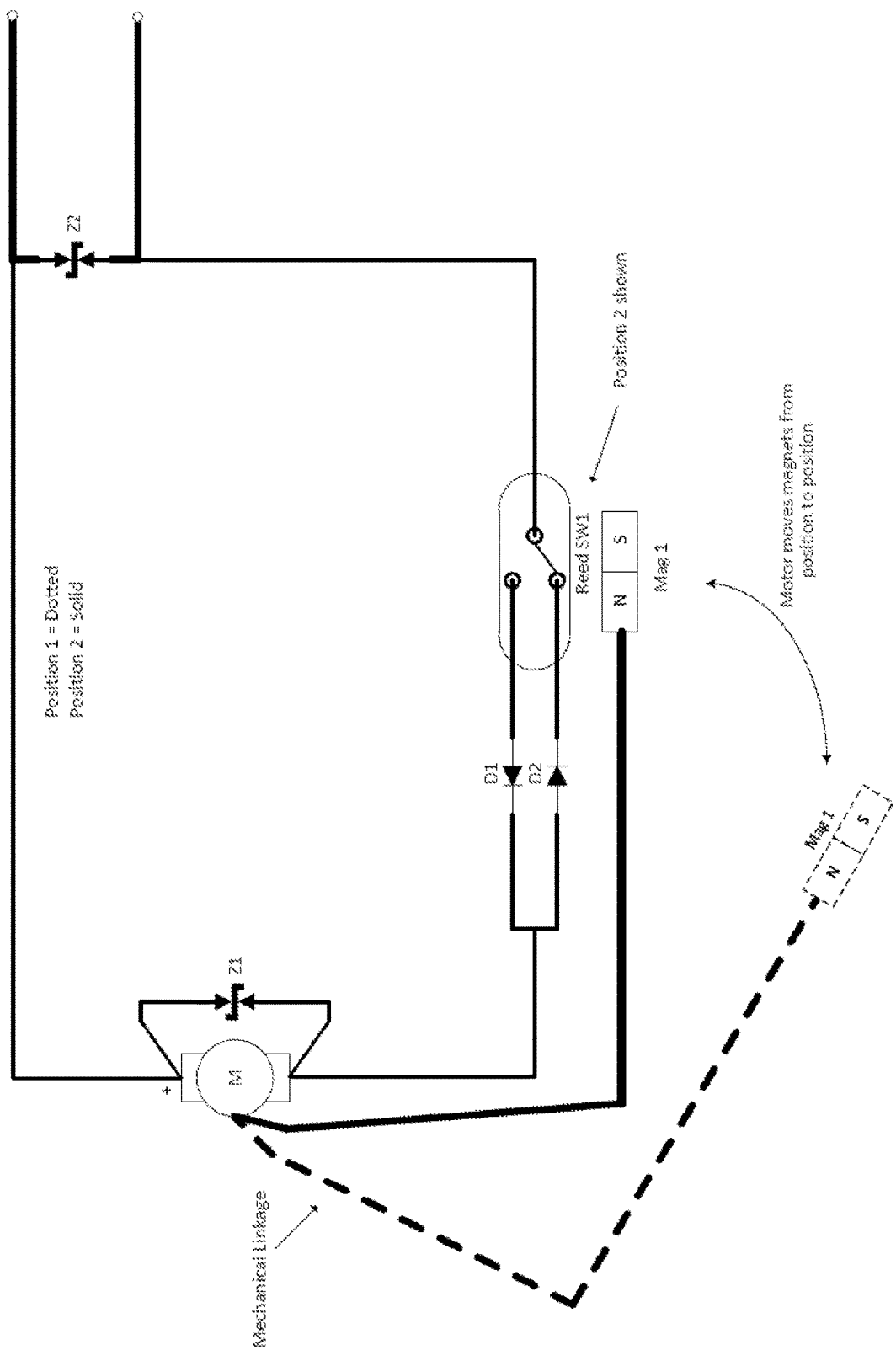

PRESSURE LOSS MITIGATION AND DURABLE VALVE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates to valves, including valves configured to control the flow of fluids.

Description of the Related Art

Agricultural processes utilize valves to control fluids for the growth and management of plants and livestock. These processes include irrigation, fertigation, chemigation, pest (e.g., animal, insect, viral, fungal, bacterial) control, weed control, cooling of crops and livestock, dust control, and drinking. Additionally, industrial processes (non-agricultural) utilize valves for control of fluids that are and including feedstock (e.g., for bottled water) or where fluids control something (e.g., cooling, dust control).

However, conventional valves suffer from disadvantageous pressure loss, lack of reliability with both valve and valve automation components, and the expense and complexity of valve automation components.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a valve that comprises a housing including: a chamber; a fluid inlet comprising a fluid inlet passage configured to fluidly communicate with a first conduit, wherein the fluid inlet is configured to communicate fluid from the first conduit to the chamber; a fluid outlet comprising a fluid outlet passage configured to fluidly communicate with a second conduit, wherein the fluid outlet is configured to communicate fluid from the chamber to the second conduit; an impermeable, compressible and/or flexible and/or stretchable membrane, wherein the valve is configured to position said membrane between the fluid inlet and the fluid outlet when the valve is in a closed position, and wherein a fluid pressure within the chamber causes said membrane to seal a first orifice of the fluid outlet passage when the valve is in the closed position.

An aspect of the present disclosure relates to a valve, comprising: a chamber; a fluid inlet comprising a fluid inlet passage configured to fluidly communicate with a first fluid conduit, wherein the fluid inlet is configured to communicate fluid from the first fluid conduit to the chamber; a fluid outlet comprising a fluid outlet passage configured to fluidly communicate with a second fluid conduit, wherein the fluid outlet is configured to communicate fluid from the chamber to the second fluid conduit; an impermeable, compressible and/or flexible and/or stretchable membrane, wherein said membrane is configured to be slidably positioned so that said membrane is located between the fluid inlet and the fluid outlet when the valve is in a closed position, and wherein a fluid pressure causes said membrane to seal a first orifice of the fluid outlet passage when the valve is in the closed position.

An aspect of the present disclosure relates to a valve, comprising: a chamber; a fluid inlet comprising a fluid inlet passage configured to fluidly communicate with a first fluid conduit, wherein the fluid inlet is configured to communicate fluid from the first fluid conduit to the chamber; a fluid outlet comprising a fluid outlet passage configured to fluidly communicate with a second fluid conduit, wherein the fluid outlet is configured to communicate fluid from the chamber to the second fluid conduit; an impermeable, compressible and/or flexible and/or stretchable membrane, wherein said membrane is configured to be slidably positioned so that the said membrane is located between the fluid inlet and the fluid outlet when the valve is in a closed position, and wherein a fluid pressure causes said membrane to seal a first orifice of the fluid outlet passage when the valve is in the closed position.

An aspect of the present disclosure relates to a valve, comprising: a chamber; a fluid inlet comprising a fluid inlet passage configured to fluidly communicate with a first fluid conduit, wherein the fluid inlet is configured to communicate fluid from the first fluid conduit to the chamber; a fluid outlet comprising a fluid outlet passage configured to fluidly communicate with a second fluid conduit, wherein the fluid outlet is configured to communicate fluid from the chamber to the second fluid conduit; an impermeable, compressible and/or flexible and/or stretchable membrane, wherein said membrane is configured to be positioned so that said membrane is located between the fluid inlet and the fluid outlet when the valve is in a closed position, and wherein a fluid pressure causes said membrane to seal a first orifice of the fluid outlet passage when the valve is in the closed position.

An aspect of the present disclosure relates to an irrigation valve, comprising: a plastic housing having an exterior surface and an interior surface, the interior surface defining at least one chamber, the plastic housing having: an exterior surface; a fluid inlet defined by a fluid inlet wall, the fluid inlet wall extending outward from the exterior surface, the fluid inlet wall defining a threaded first fluid inlet orifice configured to engage a first threaded fluid conduit, wherein the fluid inlet wall does not extend into the chamber, and wherein the fluid inlet comprises a second fluid inlet orifice defined by the interior surface of the housing, wherein the fluid inlet is configured to communicate fluid from the first fluid conduit from the first orifice to the second fluid inlet orifice, and from the second fluid inlet orifice to the chamber; a fluid outlet defined by a fluid outlet wall, the fluid outlet wall comprising: a first portion extending outward from the exterior surface opposite the fluid inlet wall, the first portion of the fluid outlet wall defining a threaded first fluid outlet orifice configured to engage a second threaded fluid conduit, a second portion extending inwards from the interior surface of the housing interior surface into the chamber, wherein the fluid outlet comprises a second fluid outlet orifice defined by the second portion of the fluid outlet wall, wherein the fluid outlet is configured to communicate fluid from the chamber to the second threaded fluid conduit; a movable rigid substrate having a first surface and a second surface, wherein the first surface is closer to the second fluid outlet orifice than the second surface; and a compressible, impermeable, membrane mounted on the first surface of the rigid substrate, wherein the movable rigid substrate is configured to be positioned so that the compressible, impermeable, membrane is located between the second fluid inlet orifice and the second fluid outlet orifice when the irrigation valve is in a closed position, and wherein a fluid pressure within the chamber causes the compressible, impermeable, membrane to seal the second fluid outlet orifice, and not the second fluid inlet orifice, when the irrigation valve is in the closed position, and wherein the movable rigid substrate is optionally configured to move along a path having a start and end, at least half of which is along a first axis.

An aspect of the present disclosure relates to a valve, comprising: a housing having an exterior surface and an interior surface, the interior surface defining a chamber, the housing having: a fluid inlet comprising a first fluid inlet orifice, configured to fluidly communicate with a first fluid conduit, and a second fluid inlet orifice in fluid communication with the chamber, wherein the fluid inlet is configured to communicate fluid from the first fluid conduit from the first orifice to the second fluid inlet orifice, and from the second fluid inlet orifice to the chamber; a fluid outlet defined by a fluid outlet wall, the fluid outlet wall comprising: a first portion extending outward from the exterior surface of the valve opposite the fluid inlet wall, the first portion of the fluid outlet wall defining a first fluid outlet orifice configured to receive a second fluid conduit, a second portion extending inwards from the interior surface of the housing interior surface into the chamber, wherein the fluid outlet comprises a second fluid outlet orifice defined by the second portion of the fluid outlet wall, wherein the fluid outlet is configured to communicate fluid from the chamber to the second fluid conduit; an impermeable, compressible membrane, wherein the impermeable, compressible membrane is configured to be slidably positioned so that the impermeable, compressible membrane is located between the second fluid inlet orifice and the second fluid outlet orifice when the valve is in a closed position, and wherein a fluid pressure within the chamber causes the impermeable, compressible, membrane to seal the second fluid outlet orifice when the valve is in the closed position, thereby providing a single interface seal, and wherein the impermeable, compressible membrane is optionally configured to move along a path at least half of which is along a first axis.

An aspect of the present disclosure relates to a valve, comprising: a housing having an exterior surface and an interior surface, the interior surface defining a chamber, the housing having: a fluid inlet comprising a fluid inlet passage configured to fluidly communicate with a first fluid conduit, wherein the fluid inlet is configured to communicate fluid from the first fluid conduit to the chamber; a fluid outlet comprising a fluid outlet passage configured to fluidly communicate with a second fluid conduit, wherein the fluid outlet is configured to communicate fluid from the chamber to the second fluid conduit; an impermeable, compressible membrane on the first surface of the rigid substrate, wherein the impermeable, compressible membrane is configured to be moved along a path, more than half of which is along a first axis so that the impermeable, compressible membrane is located between the fluid inlet and the fluid outlet when the valve is in a closed position, and wherein a fluid pressure within the chamber causes the impermeable, compressible membrane to seal a first orifice of the fluid outlet passage when the valve is in the closed position thereby providing a single sealing interface.

BRIEF DESCRIPTION OF THE DRAWINGS

Embodiments will now be described with reference to the drawings summarized below. Throughout the drawings, reference numbers may be re-used to indicate correspondence between referenced elements. The drawings are provided to illustrate example embodiments described herein and are not intended to limit the scope of the disclosure.

FIGS. 1A-G illustrate an example 4-way piston valve.
FIGS. 2A-G illustrate an example 3-way piston valve.
FIGS. 3A-I illustrate an example motorized piston valve.
FIGS. 4A-H illustrate an example motorized slide valve.
FIG. 9 illustrates an example valve electrical circuit

DETAILED DESCRIPTION

Figure 1D:
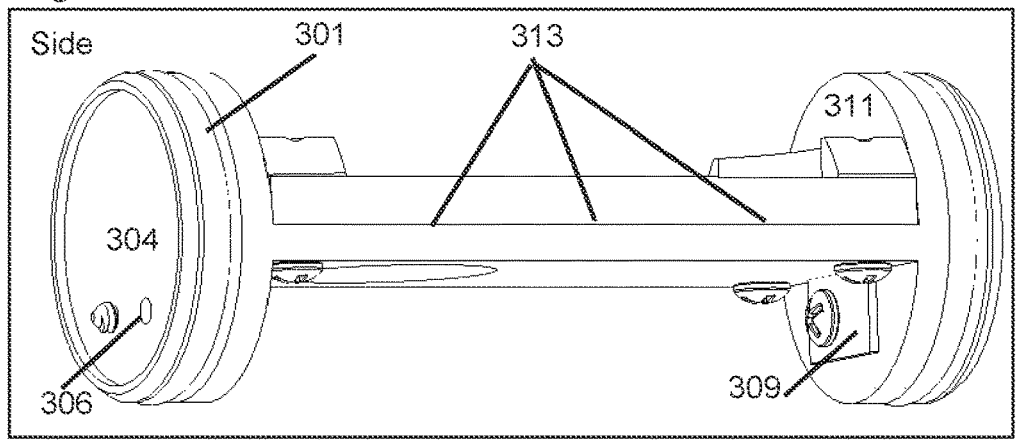

An aspect of the present disclosure relates to an enhanced valve that provides reduced pressure drop and higher reliability than conventional valves.

Fluid valves regulate, direct, or control flow of fluids by opening, closing, or partially obstructing passageways. As used herein, the term "fluid" may include, by way of example, agricultural, industrial, and drinkable fluids, aqueous solutions, gases, liquids, fluidized solids, and slurries.

A representative valve in agricultural and industrial applications is a "control valve" which switches fluid flow "On" or "Off". Such valves may be two or three-way diaphragm valves or piston valves and can optionally be automated with electric pilots (e.g., a solenoid valve). By of further illustration, a valve may be a gate valve, a ball valve, a diaphragm valve, a plug valve, a knife valve, a curtain valve, a pinch valve, or a slide valve. Control valves can be modified into "flow control valves" which introduce pressure loss to modify fluid flow rates. Herein, control and flow-control valves may be referred to singularly as a "valve" or in the plural as 'valves".

Valve design is dictated by several factors, including cost and function. Low cost valves (e.g., such as a diaphragm valve) are typically designed for a single function such as On-OFF fluid control. Additional functions that, for example reduce pressure loss, conventionally require costly engineering features and/or components such as larger or highly engineered flow passages. As an example, ball and gate valves, which have ultra-low-pressure losses, conventionally require costly automation systems, such as high-power motors because of the higher friction from two valve seats and/or continuous seat contact with channels and guides for the sealing elements.

In contrast to such conventional valves, an aspect of the present disclosure relates to low cost, low pressure-loss valves, optionally with single seats, where the single seats are in controlled intermittent contact with sealing elements. Advantageously, certain disclosed valves can optionally be automated at relatively low cost using inexpensive pilots such as, by way of example, low power motors or solenoids.

Fluid pressure-loss or friction loss ("pressure loss" or "loss") describes pressure drop between where a fluid enters a system or component (e.g., a valve) and exits. Pressure loss is a complex function of flow-path geometry, fluid properties, and flow rate. Flow through a valve produces flow patterns that are a combination of laminar, turbulent or transitional as vividly described by Osborne Reynolds (who the Reynolds number (Re), which is used to predict flow patterns in different fluid flow situations, is named after). Laminar flow is described as "orderly" whereas turbulent flow is "chaotic" and leads to greatest pressure losses. In inexpensive valves pressure loss is a widespread problem due to minimal laminar flow capabilities. For example, conventional ¾" diaphragm control valves can produce pressure losses as high as 5-10 psi at flow rates of 25 gallons per minute (gpm).

Valves of many sizes, typically ⅛" to 3' in diameter, are used in industrial and agricultural systems. An example agricultural irrigation system is a center pivot machine employing, by way of illustrative example, 1-150 sprinklers across approximately 1,000-2,000 feet of 3-10" diameter pipe spans, rotating around a fixed point. Sprinklers closest to the center may deliver fluids at 0.1-3.0 gpm, whereas outer sprinklers may deliver fluids at rates that can exceed 20 gpm. Valves are used in pivot applications, including and optionally, ¾" valves for control of sprinklers including to prevent fluid runoff or groundwater pollution in areas of the field where less fluid is needed, directional spraying to keep fluid off of hardware, and "end guns" where fluid is sprayed beyond the end of the pivot.

Pressure loss is an important consideration in industrial and agricultural applications for reasons including:

a. Fluid systems generally should run at lowest practical pressures for a given application to save energy. Lost pressure requires greater and costlier fluid pressures and larger pumps in both industrial and agricultural applications.

b. Pressure is needed to deliver sufficient fluid flow rates and amounts. Inadequate pressure, and therefore inadequate flow, results in agricultural and industrial processes receiving inadequate fluids.

c. Pressure is needed to deliver sufficient area coverage or sprinkler "throw". Inadequate pressure means the distance fluid travels, once ejected from a sprinkler or other orifice, is reduced and therefore fluid coverage is reduced. Other coverage issues may arise in industrial applications, as in a mining or cattle applications, where dust control is achieved via sprinklers.

In contrast to the conventional valves discussed above, disclosed herein are valves with low-pressure loss, optionally and in the case of an example embodiment of a ¾" valve, producing less than 2-5 psi pressure loss at a flow rate of 25 gpm. The disclosed valves may be optionally be configured to deliver high pressure loss in order to function as flow control valves. Disclosed are multiple example designs with one or more impermeable, compressible and/or flexible and/or stretchable membranes attached to a rigid membrane support and assembly that slides, rolls, spins, rotates, swings, repositions, creeps, falls, settles, flows, spread, and/or flips over and seals to a rigid valve seat.

The membrane has the larger cross section and the stationary mating element has the smaller cross section. Said combination should enable a more durable membrane versus a smaller cross section of the membrane. Other flexible-rigid combinations may be utilized, including a flexible seat combined with a rigid membrane.

Optionally, sealing may be performed on the downstream (outflow) side of the valve using a single sealing interface. The optional single sealing interface (on downstream side versus sealing both downstream and upstream) utilizes pressure delivered from a valve inlet to hold the valve seat closed. Advantageously, a single sealing seat requires less friction to change position versus two sealing interfaces or seats, as with conventional ball and gate valves that seal both on the upstream and downstream sides or seats.

Certain example embodiments seal only on the outlet side of the valve (in contrast with certain conventional valves which require a structure that seals both the inlet and outlet side). Referring now to FIGS. 1A-6G and 8A-8N, the example membrane 303 has a larger cross section (width and thickness) than the stationary and more rigid mating and sealing element or seat 100 and said membrane may be affixed to the membrane support 312 with a multitude of techniques including screws and/or adhesive. Optionally, on the inside of the outlet side 140 of the valve, the seat protrudes inward towards an impermeable, compressible and/or flexible and/or stretchable membrane. When the valve is in a closed state and depressurized, a small distance (0-5 mm in a ¾" valve) forms between the membrane and seat as the membrane retracts from a pressurized or stretched, compressed, or flexible state. The valve dimensions are such that minimized friction and contact forms between the membrane and the seat in the absence of pressure. Optionally, the seat 100 may not protrude and therefore may be parallel with the inside surface of the valve as long as the valve's component dimensions change to bring the membrane within a certain distance (0-5 mm in a ¾" valve) of the seat. Pressure is required to seal between the membrane 303 and the seat 100, and in a closed state, while pressurized, there is no space between the membrane and the seat and the membrane's impermeable, compressible and/or flexible and/or stretchable properties facilitate contact with the seal. The membrane can flex, stretch or otherwise move away from the membrane support structure 312 beginning at the support interface 313 and towards the valve seat 100 (at the interior orifice of the outlet passageway that fluidly communicates with an outlet orifice configured to be coupled to a fluid conduit) (see, e.g., FIGS. 1A-D). When the valve is in the closed or "Off" state, and when fluid is fully or partially depressurized, the membrane partially or fully breaks seal on its own or in the presence of vacuum and/or gravity forces on the membrane and/or fluids, and fluids fully or partially drain from the inlet or outlet. Accordingly, disclosed embodiments are minimally susceptible to freezing damage from the expansion of fluids that may expand and crack conventional valve structures. When the valve is fully or partially depressurized in the "On" position, similar freeze protection is provided with even less hindrance to fluid drainage.

Certain disclosed example embodiments have a mostly laminar fluid flow path, minimizing pressure loss, however pressure loss and flow control can be achieved by partially opening or closing the valve or by achieving a partial seal. No springs are required but may be used. Further, certain disclosed embodiments do not utilize a wedging action or plug in forming a seal when the valve is closed. The use of wedging action in sealing a valve may disadvantageously prevent water drainage from the valve, which may result in valve damage in freezing conditions as the frozen water in the valve, which expands relative to water in the fluid state, may burst or otherwise damage the valve. By contrast, in certain disclosed embodiments, when the valve is in the "off", closed position, and when fluid is fully or partially depressurized, the membrane partially or fully breaks seal on its own or in the presence of vacuum and/or gravity forces on the membrane and/or fluids, and fluids fully or partially drain from the inlet and/or outlet, thereby inhibiting the occurrence of frozen fluids within the valve, and the resulting damage.

The disclosed embodiments are durable and may optionally have designed mean-times-to-failure greater than one million on/Off cycles, even in solids-laden fluid, such as sandy water. Conventional valves are prone to diaphragm failure via flexing which causes stress fractures with mean times to failure in the range of thousands of cycles depending on pressure. Certain disclosed valve closure members (or membranes) are configured with an impermeable, compressible and/or flexible and/or stretchable membrane (which may optionally be mounted on a rigid substrate, such as a sliding rigid substrate examples of which are described herein), so damage from flexing is significantly reduced. The membrane can optionally be thicker than that of a conventional valve diaphragm (typically 0.025-0.500"), however optionally the preferred rage is 0.01"-36.0" with about a 0.188" thickness being especially preferred for a ¾" valve.

In conventional gate and similar valves, which use guides (e.g., slots, channels, or other guides), such guides add to friction when opening or close the gate. Said guides sometimes also function as valve seats and generally ensure proper alignment and/or sealing of valve closure members and other mobile valve elements. Disadvantageously, these guides can accumulate debris and hinder movement of the valve closure members and other mobile valve elements. In the following disclosed embodiments, guides are minimized or not used (and so the issues of friction and debris blockages are correspondingly reduced), but optionally can be used.

Optionally, the rigid exterior or interior of the valve and components may be made of combinations of chemical resistant plastic compounds such as acetal, glass filled nylon, polyvinyl chloride, chlorinated polyvinyl chloride, polypropylene, and/or polyvinylidene fluoride. These compounds may include UV blocking fillers such as carbon black to thereby enhance sun resistance. Injection molded, milled, and/or extruded plastics may be utilized. While a metal exterior is may be used, plastic has the advantages of corrosion resistance, cost, and light weight construction that is still resistant to structural damage Optionally, the rigid exterior or interior of the valve and components may be made of non-corrosive, low friction, wear resistant material such as UHMW, PET, PBT, Teflon, Delrin, Polyimide, PEEK, PPS, nylon, Acetal, Polyester, stainless steel, or brass.

Optionally, impermeable, compressible and/or flexible and/or stretchable interior plastics, such as membranes and O-rings, may be of non-corrosive material such as nylon nitrile or rubber or rubber-like material such as Neoprene, Nitrile, Viton™, EPDM, chlorosulfonated polyethylene (CSPE) synthetic rubber, Butyl, red rubber. Impermeable, flexible and/or stretchable and compressible materials may be non-reinforced or reinforced with an unlimited number of layers of flexible or rigid reinforcement material such as the above-mentioned materials, which may be wicking or non-wicking. Optionally, the impermeable, compressible and/or flexible and/or stretchable material can encompass a broad range of hardness (e.g., 0-100 durometer on a Shore A schedule) depending on fluid or gas pressures. With fluid pressures of 0-200 psi, durometers of 20-70 (Shore A) are functional. With any material, low or high fluid absorption is optional.

Optionally, the speed at which the valve opens or closes can be adjusted for a fast close (e.g., where the valve closes in less than a second) or a slow close (e.g., where the valve closes in 1-60 seconds) to prevent or reduce water hammer.

Valve pilots with fluid ports are easily damaged by fluid particulate and fluid chemistry problems. To avoid such particulate and chemistry problems, motors may be used to open and/or close a valve, an advantage is that a solenoid, or other similar pilot, is not required, which advantageously eliminates the need for a fluid filter to produce filtered fluid, though a filter may be used.

While example ranges of dimensions are described, other dimensions may be used. Optionally, certain dimensional ratios may be maintained even when the dimensions are varies. For example, example dimensions of certain disclosed embodiments are illustrated in respective figures, including thickness and length dimensions. The ratio of thickness/length may be maintained even if the dimensions differ from the example dimensions. Certain disclosed example embodiments are illustrated as a ¾" valve, though larger or smaller valves may be used.

A given embodiment may include some or the totality of features, functionality, systems, and methods described herein.

As used herein, the term fluid means any liquid capable of distribution. In an example embodiment, the fluid is water-based and used in agricultural irrigation, drinking water, industrial water, or waste water. Other example fluids may be cooling fluids, lubricant fluids, or the like (e.g., oils, oil-water emulsions, a gas, or a water chemical mixture used for chemigation, etc.

Referring now to FIGS. 1A-6G and 8A-8N, the disclosed example embodiments of controllable fluid output control valves include an impermeable, compressible and/or flexible and/or stretchable membrane 303 attached to a rigid membrane support 312 and assembly 300 that slides over and seals to a rigid valve seat 100. Many different impermeable, compressible and/or flexible and/or stretchable and rigid combinations may be used, including an impermeable, compressible and/or flexible and/or stretchable seat 100 combined with a rigid membrane 703.

In disclosed embodiments, a membrane may move in a substantially planar fashion in a first axis, where the membrane does not deviate, in certain instances, by more than 10 degrees from the first axis, and in certain other instances, not more than 25 degrees from the first axis. In certain embodiments, more than half of the membrane travel is in a planar motion. In certain embodiments, the actuation rotation is parallel to reciprocating closure elements (e.g., the membrane) and a sealing outlet.

Figure 1E:
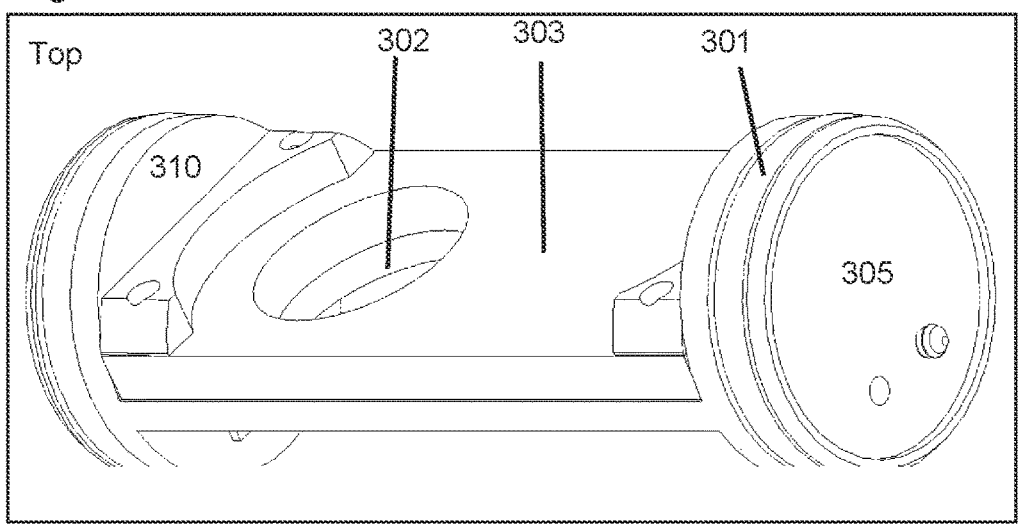
Figure 1F:
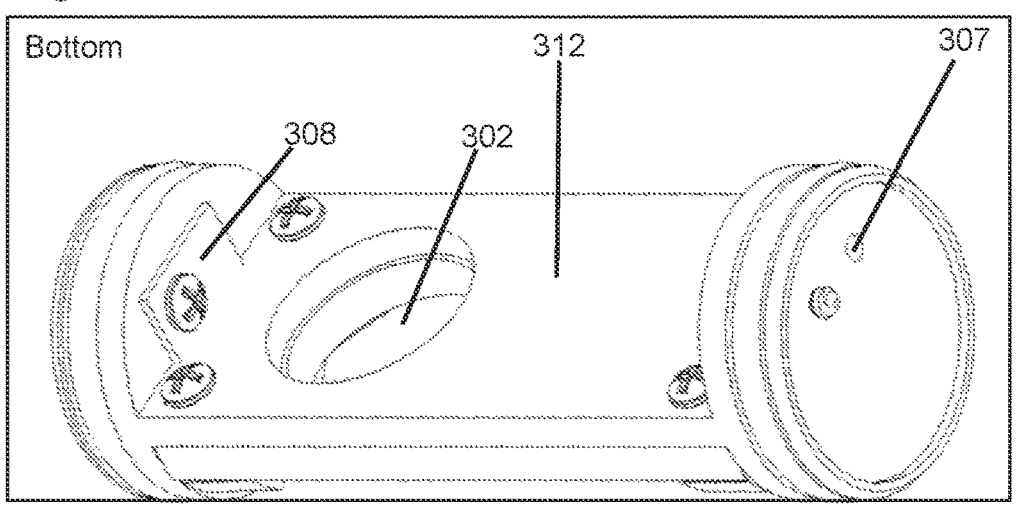
Figure 1G:
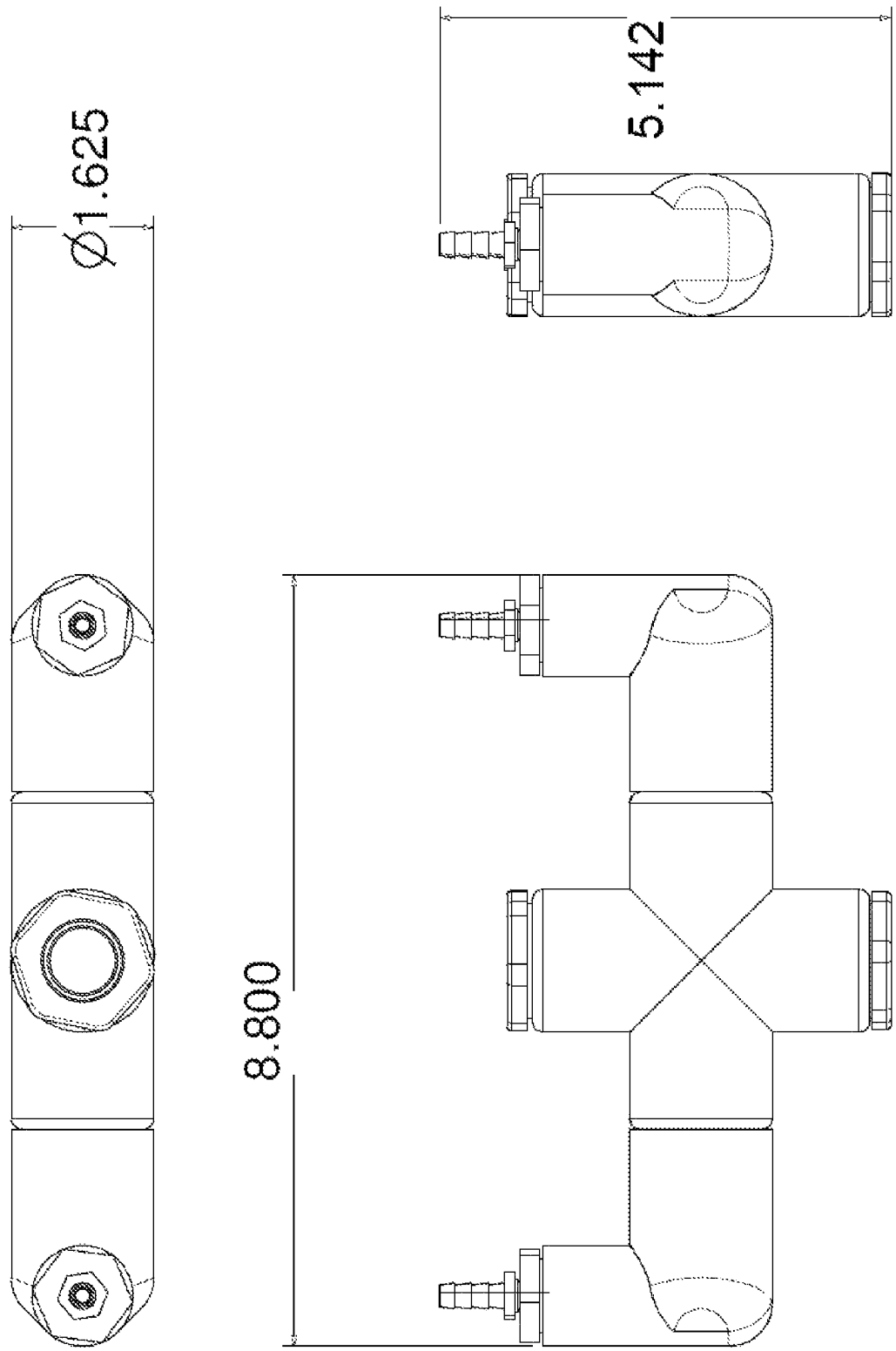

FIG. 1A illustrates an example valve housing exterior of a 4-way piston valve. FIG. 1B illustrates the example embodiment of the valve of FIG. 1A in an open position. FIG. 1C illustrates the example embodiment of the valve of FIG. 1A in a closed position. FIGS. 1D, 1E, 1F respectively illustrate example side, top, and bottom views of an example membrane assembly. FIG. 4H illustrates various views and example exterior dimensions of the 4-way piston valve of FIG. 1A.

Figure 2D:
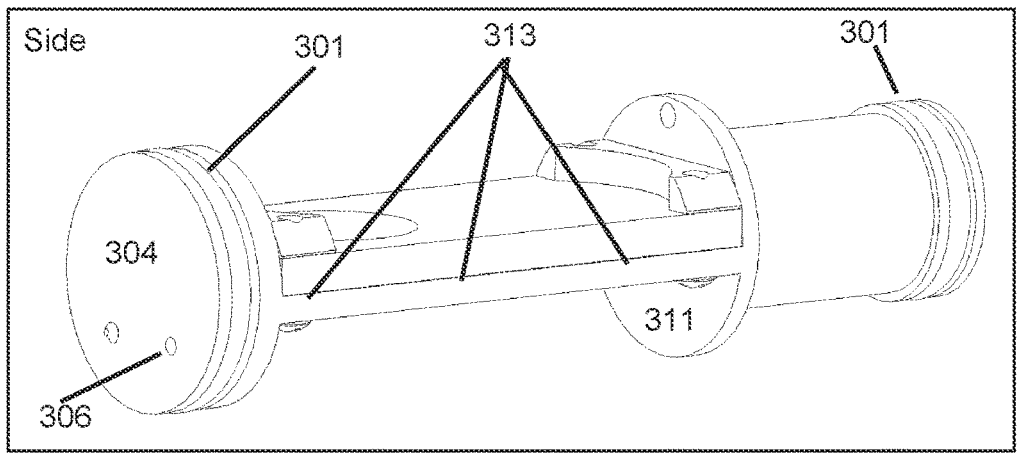
Figure 2E:
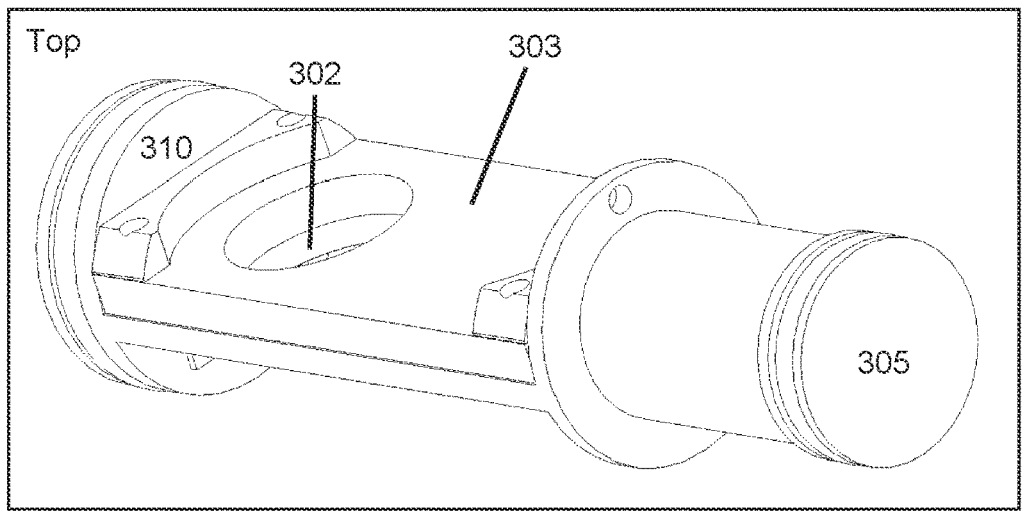
Figure 2F:
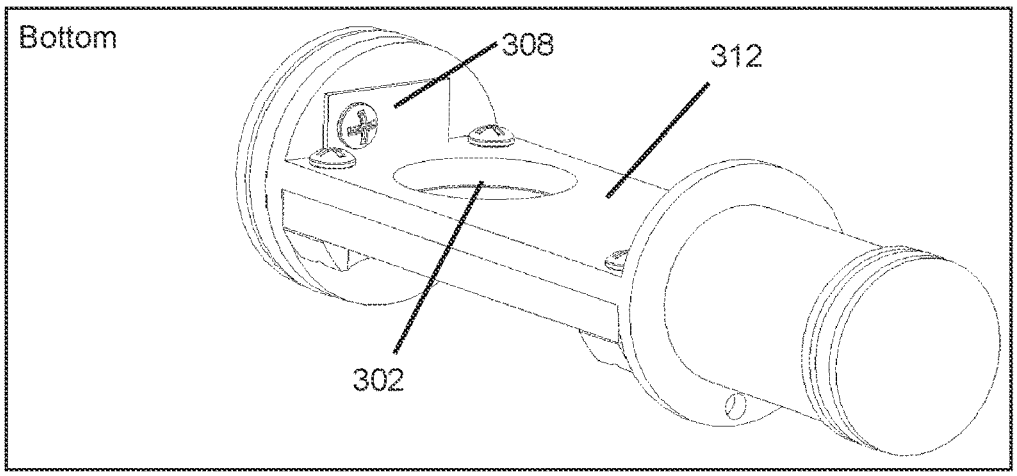
Figure 2G:
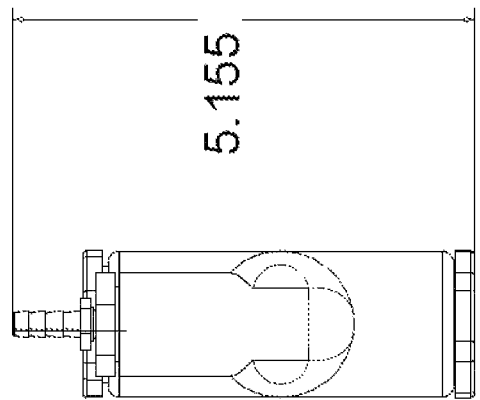
Figure 2G:
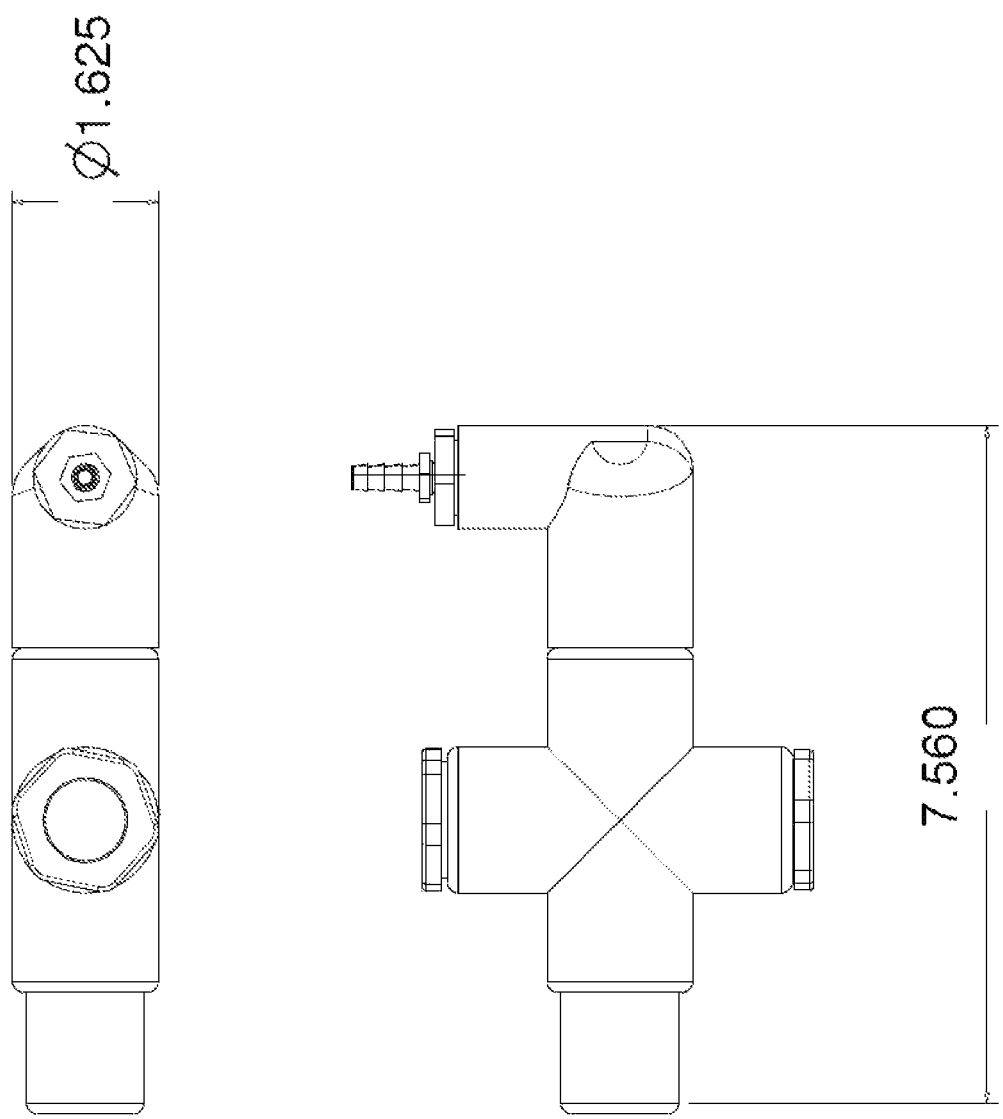

FIG. 2A illustrates an example valve housing exterior of a 3-way piston valve. FIG. 2B illustrates the example embodiment of the valve of FIG. 2A in an open position. FIG. 2C illustrates the example embodiment of the valve of FIG. 2B in a closed position. FIGS. 2D, 2E, 2F illustrate respectively example side, top, and bottom views of an example membrane assembly. FIG. 2G illustrates various views and example exterior dimensions of the 3-way piston valve of FIG. 2A.

Figure 3A:
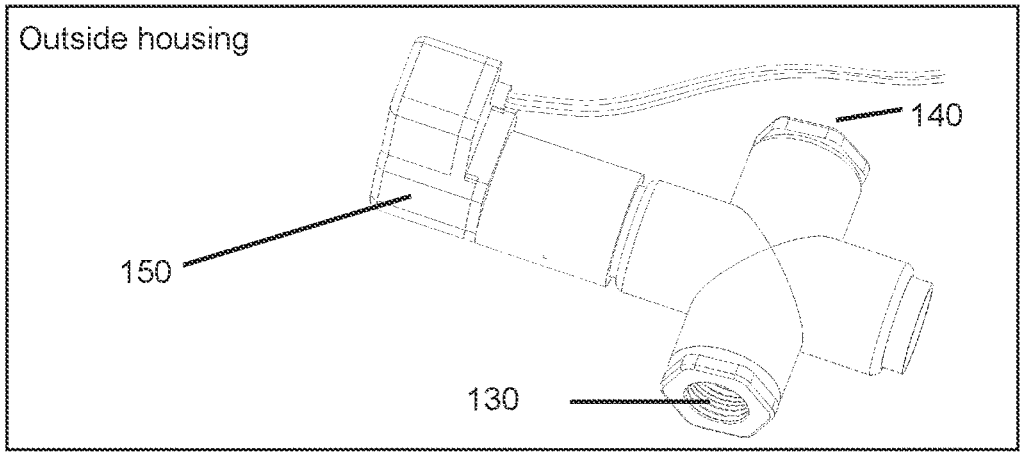
Figure 3B:
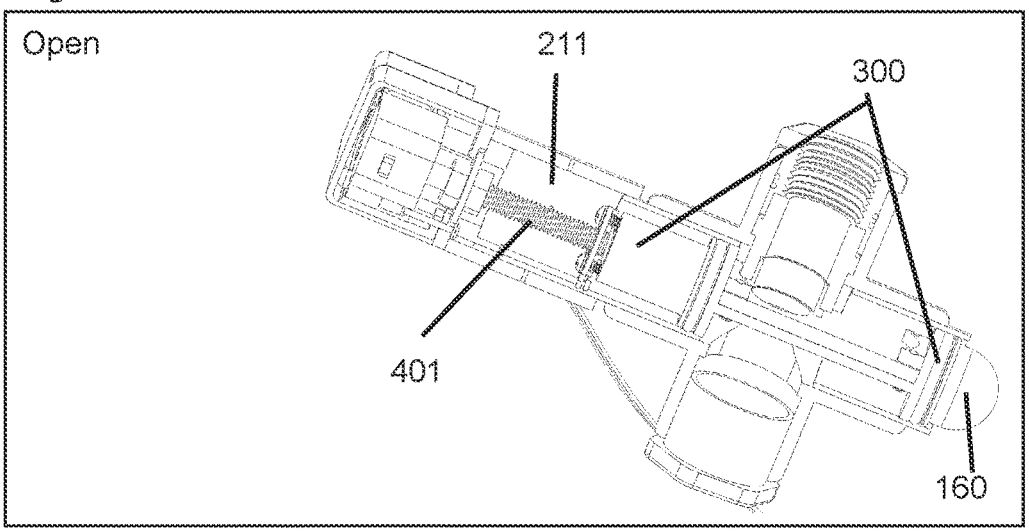
Figure 3C:
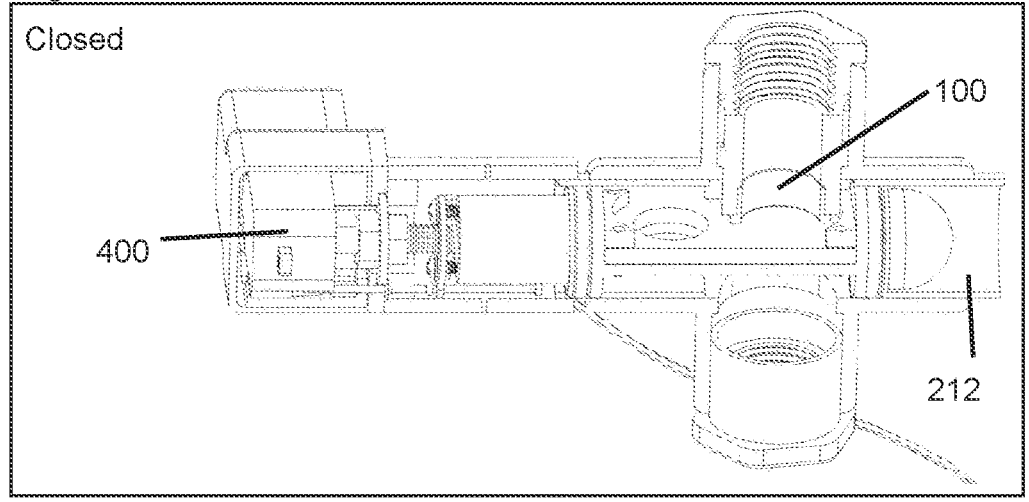
Figure 3D:
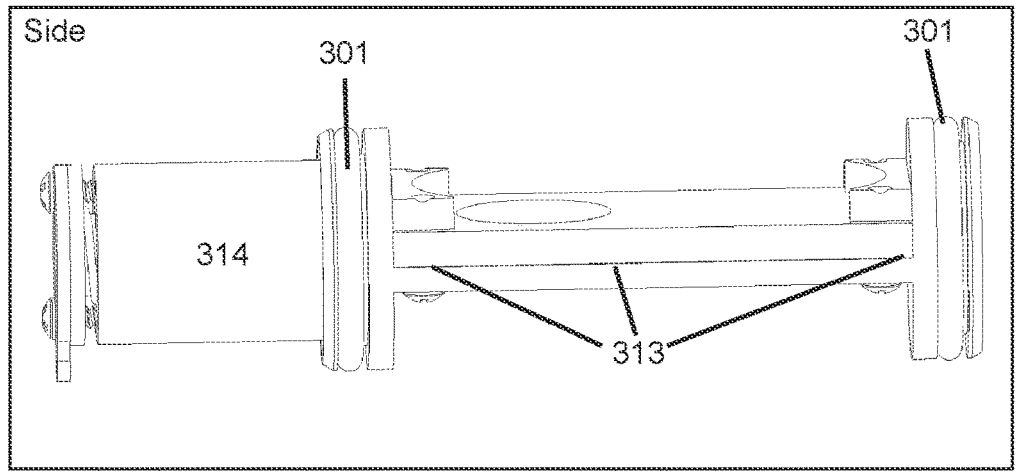
Figure 3E:
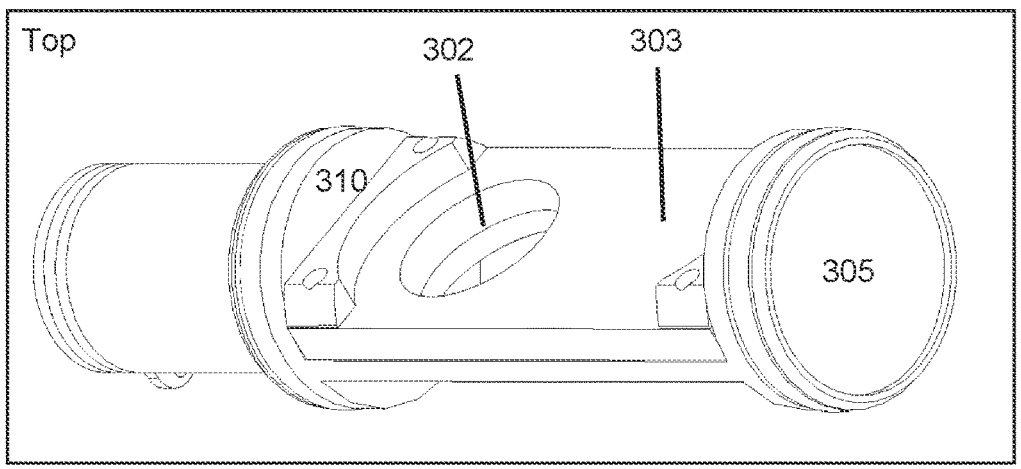
Figure 3F:
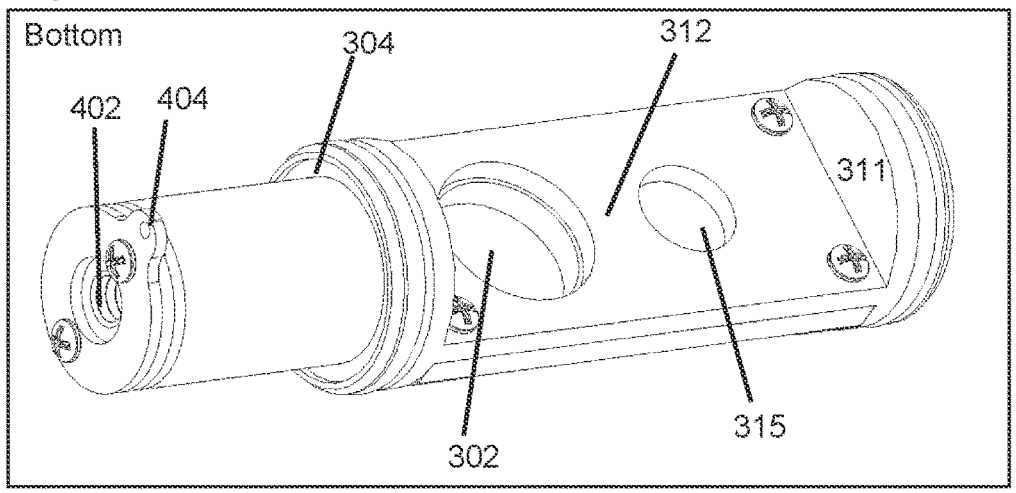
Figure 3I:
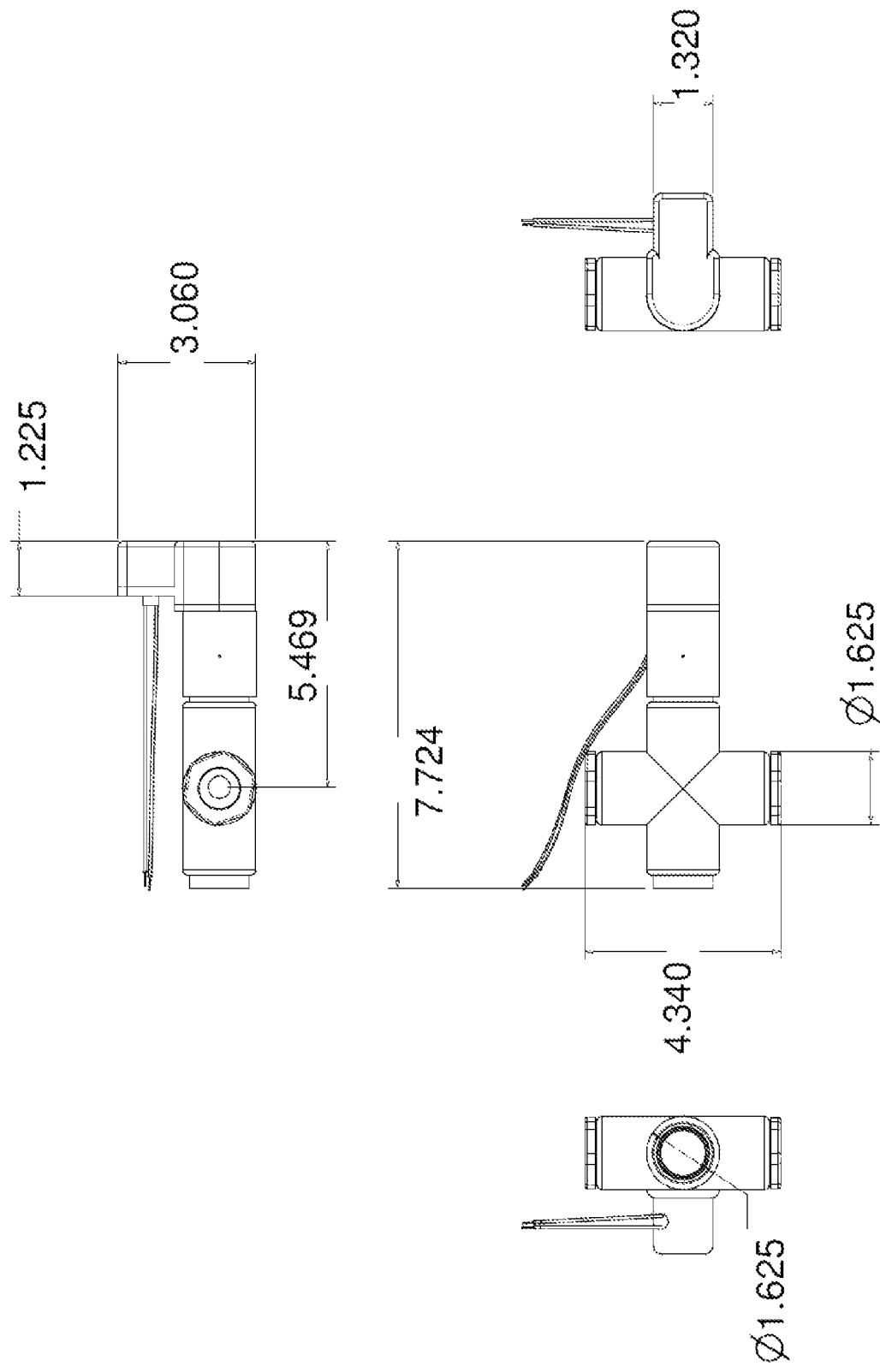

FIG. 3A illustrates an example valve housing exterior of a motorized piston valve. FIG. 3B illustrates the example embodiment of the valve of FIG. 3A in an open position. FIG. 3C illustrates the example embodiment of the valve of FIG. 3A in a closed position. FIGS. 3D, 3E, 3F respectively illustrate example side, top, and bottom views of an example membrane assembly of the valve of FIG. 3A. FIG. 3G illustrates an example motorized piston valve and motor switch assembly in the open position. FIG. 3H illustrates an example motorized piston valve and motor switch assembly in the closed position. FIG. 3I illustrates various views and example exterior dimensions of the motorized piston valve of FIG. 3A.

Figure 4A:
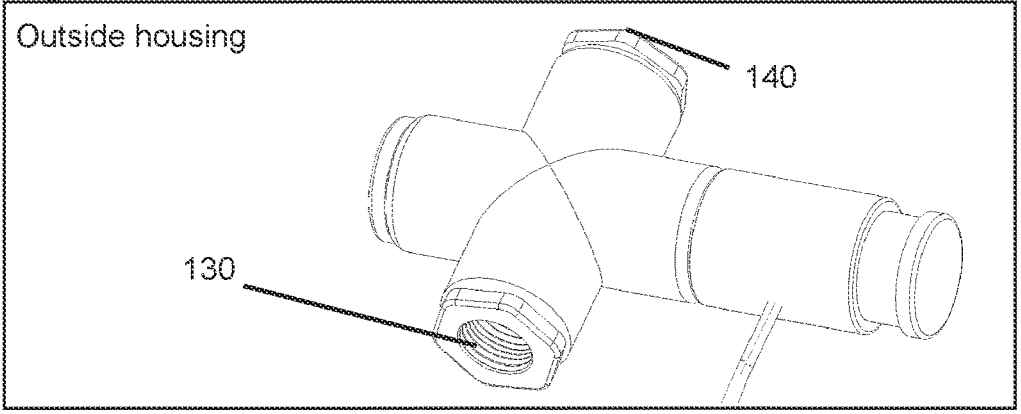
Figure 4B:
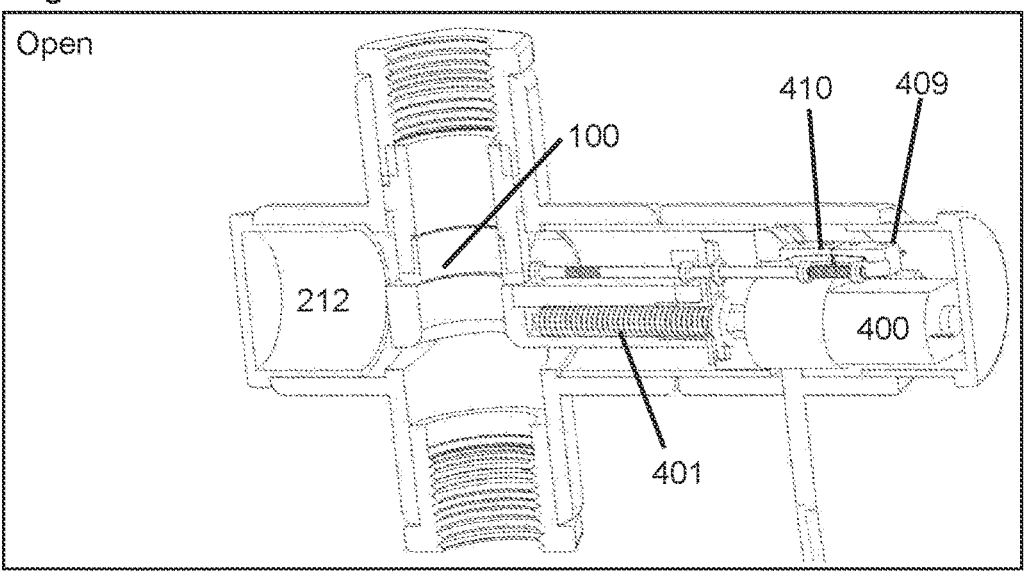
Figure 4C:
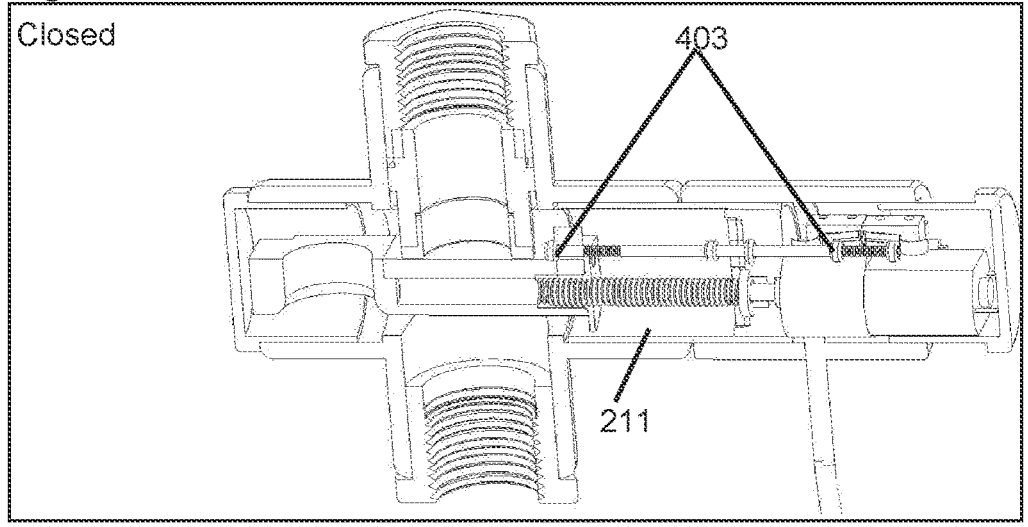
Figure 4D:
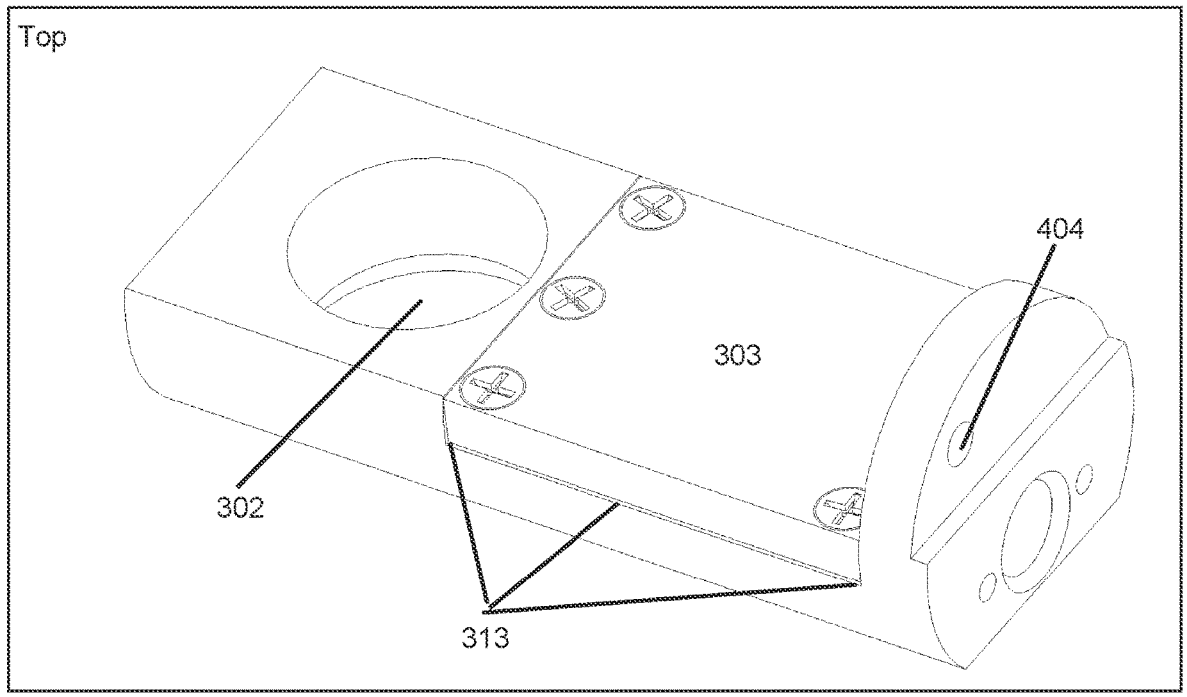
Figure 4E:
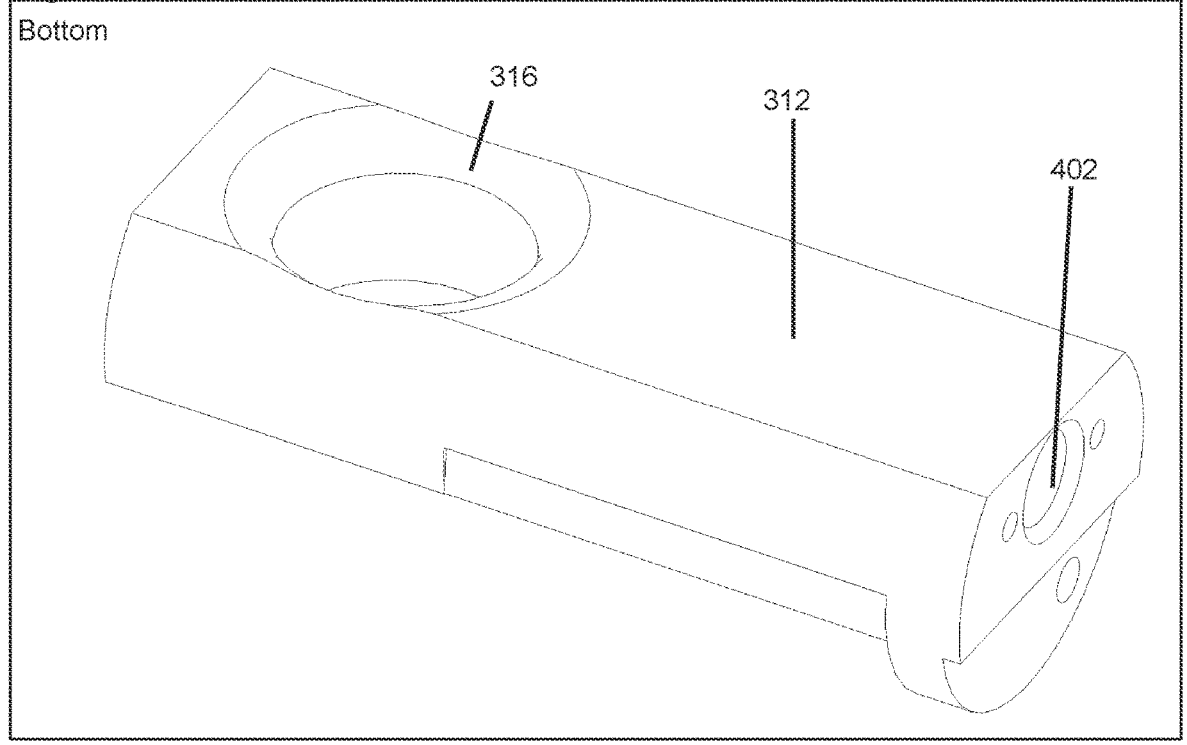

FIG. 4A illustrates an example valve housing exterior of a motorized slide valve. FIG. 4B illustrates the example embodiment of the valve of FIG. 4A in an open position. FIG. 4C illustrates the example embodiment of the valve of FIG. 4A in a closed position. FIGS. 4D and 4E illustrate example top and bottom views of an example membrane assembly of the valve of FIG. 4A. FIG. 4F illustrates an example motorized slide valve and motor switch assembly in the open position. FIG. 4G illustrates an example motorized slide valve and motor switch assembly of the valve of FIG. 4A in the closed position. FIG. 4H illustrates various views and example exterior dimensions of the motorized slide valve of FIG. 4A.

Figure 5A:
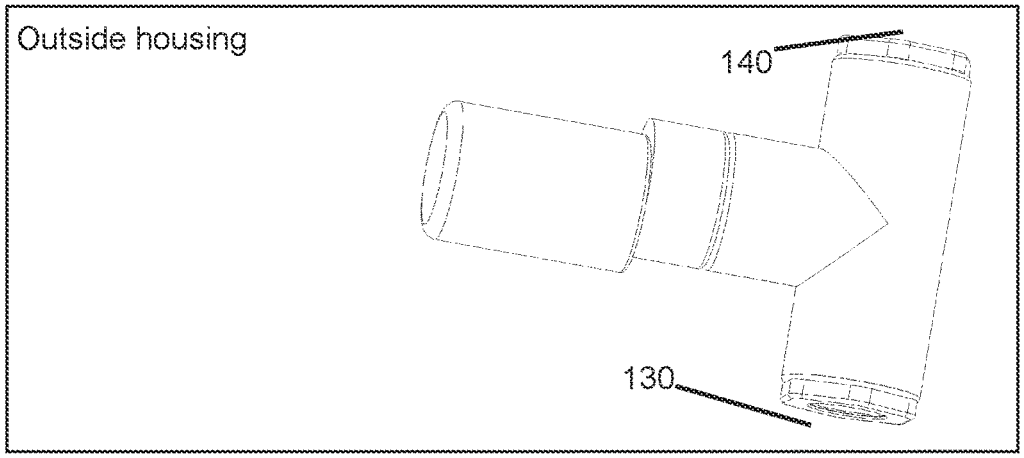
FIGS. 5A-F illustrate an example motorized slide short valve.
Figure 5B:
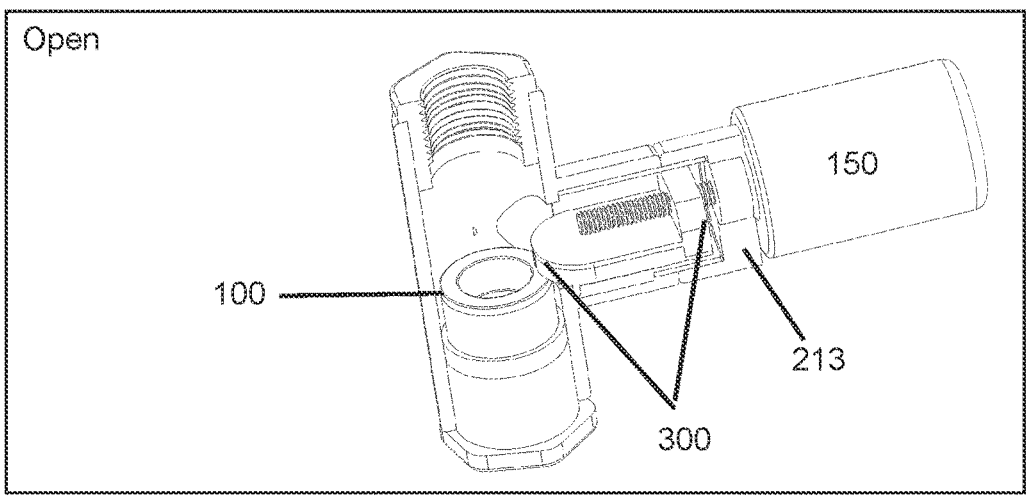
Figure 5C:
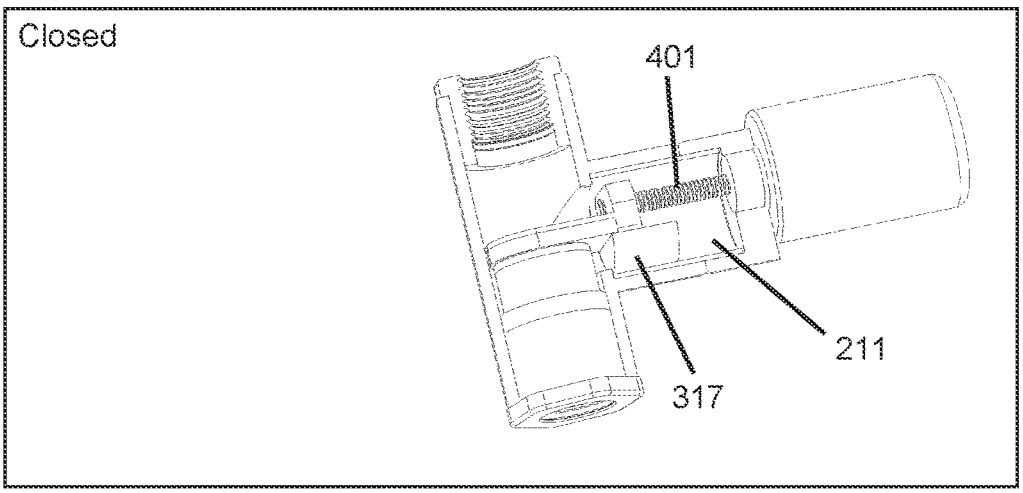
Figure 5D:
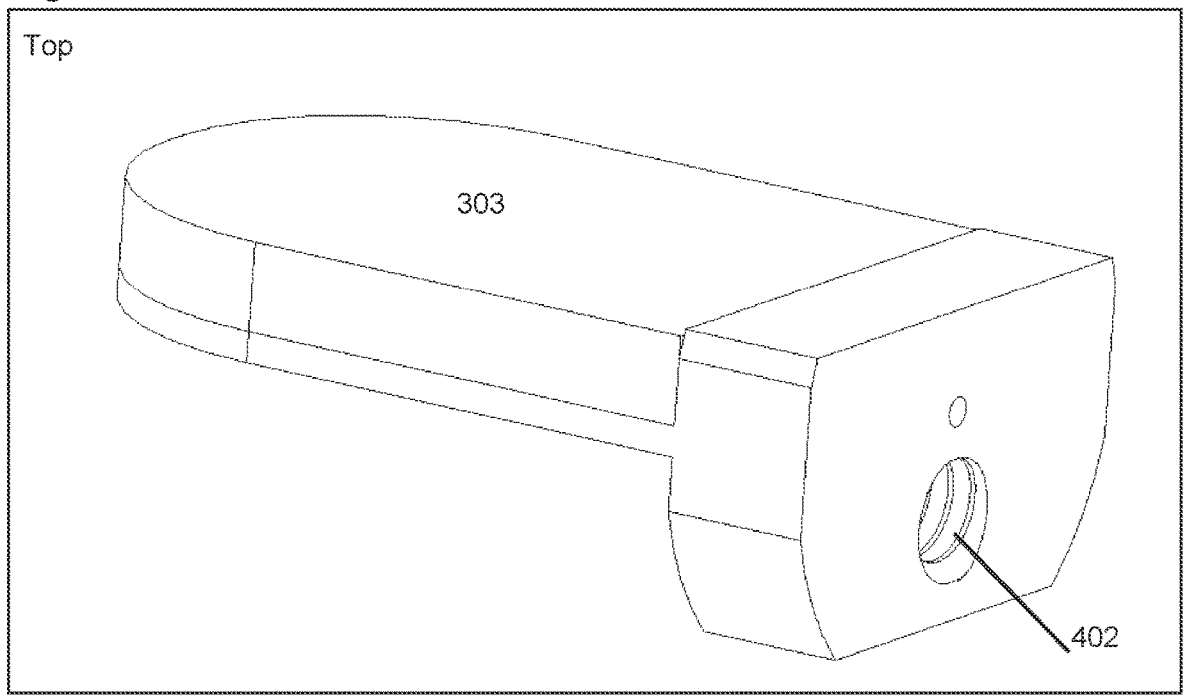
Figure 5E:
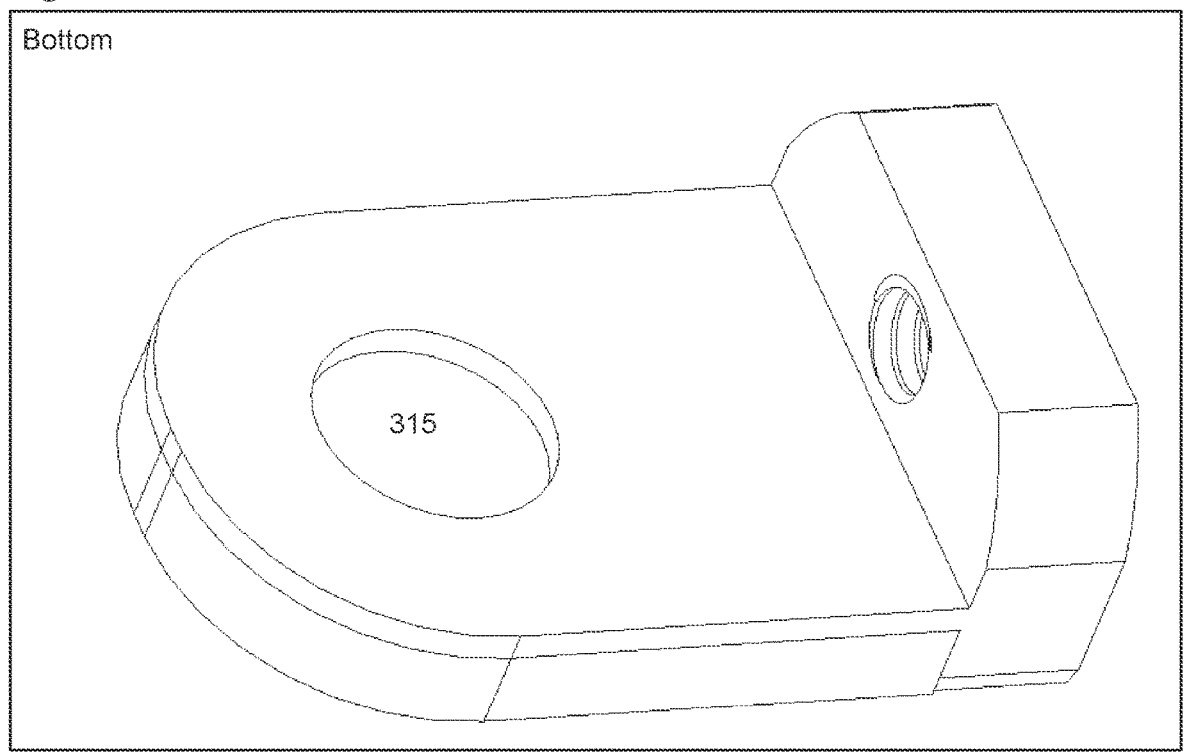
Figure 5F:
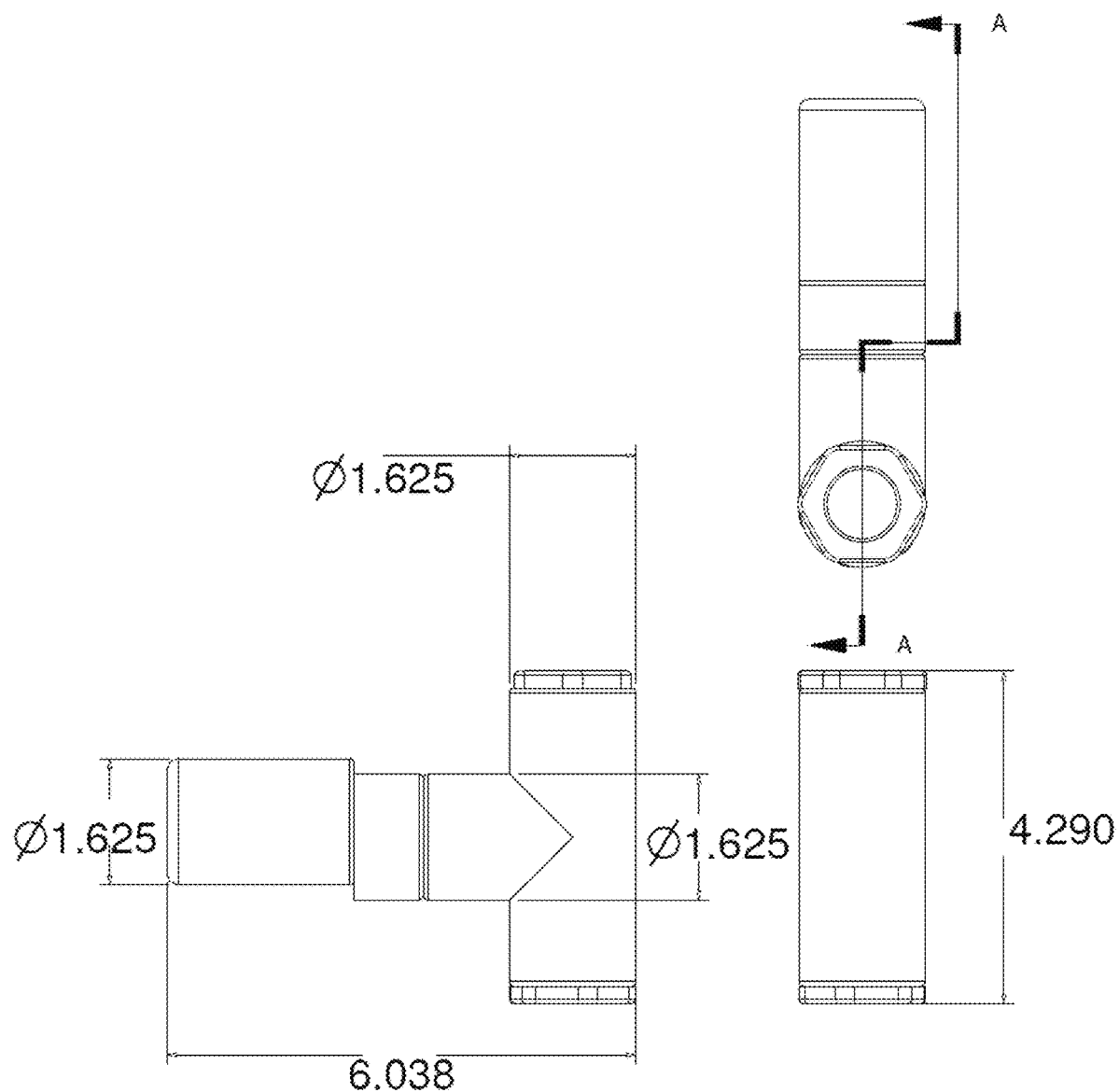

FIG. 5A illustrates an example valve housing exterior of a motorized slide valve with a relatively shorter slide. FIG. 5B illustrates the example embodiment of the valve of FIG. 5A in an open position. FIG. 5C illustrates the example embodiment of the valve of FIG. 5A in a closed position. FIGS. 5D and 5E illustrate example top and bottom views of an example membrane assembly of the valve of FIG. 5A. FIG. 5F illustrates various views and example exterior dimensions of the motorized shortened slide valve of FIG. 5A.

Figure 6A:
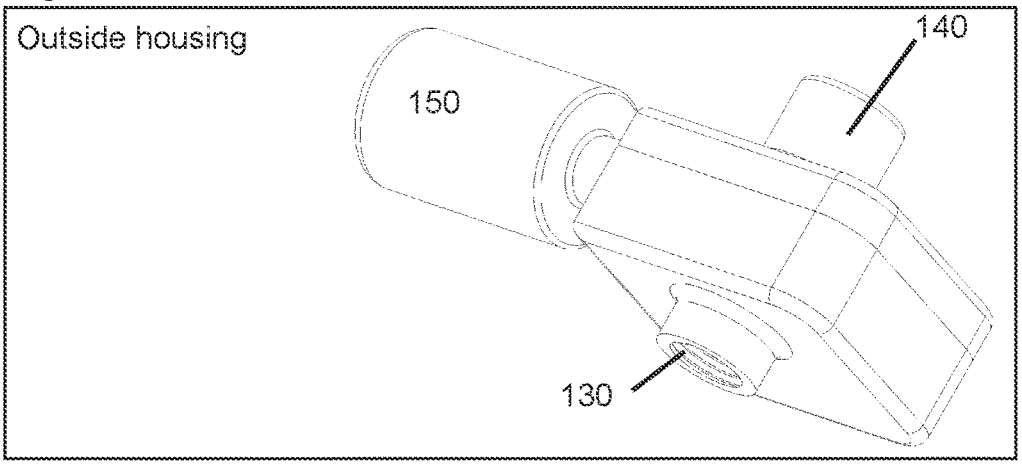
FIGS. 6A-G illustrate an example motorized pivot valve.
Figure 6B:
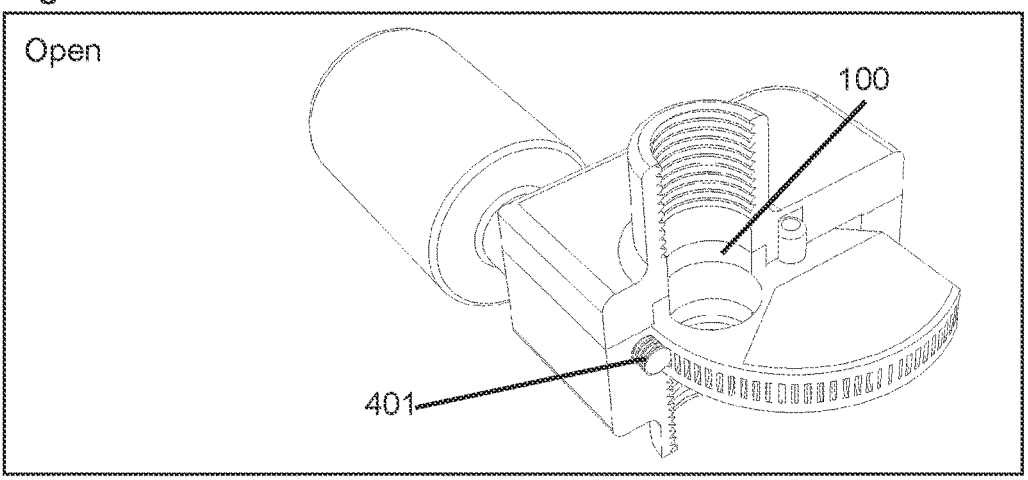
Figure 6C:
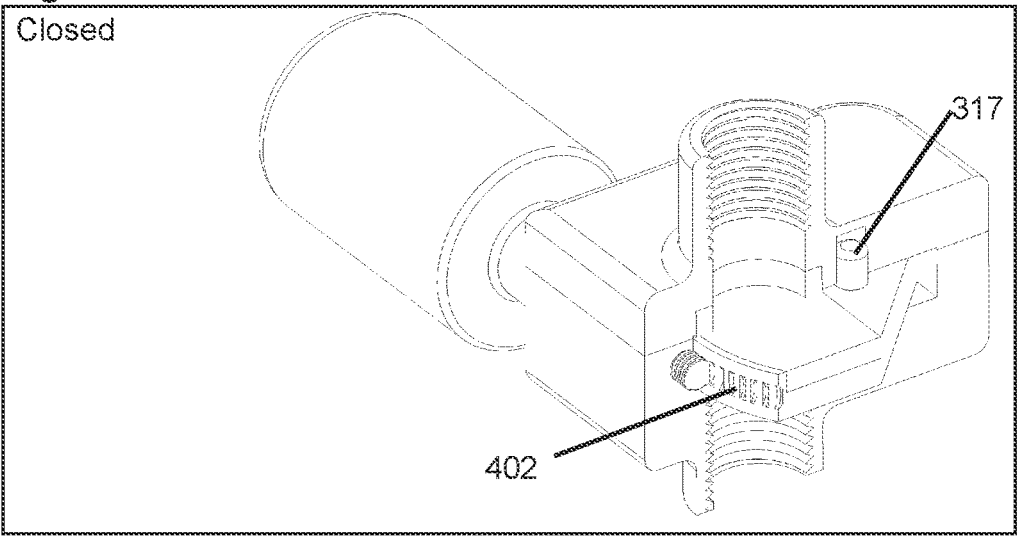
Figure 6D:
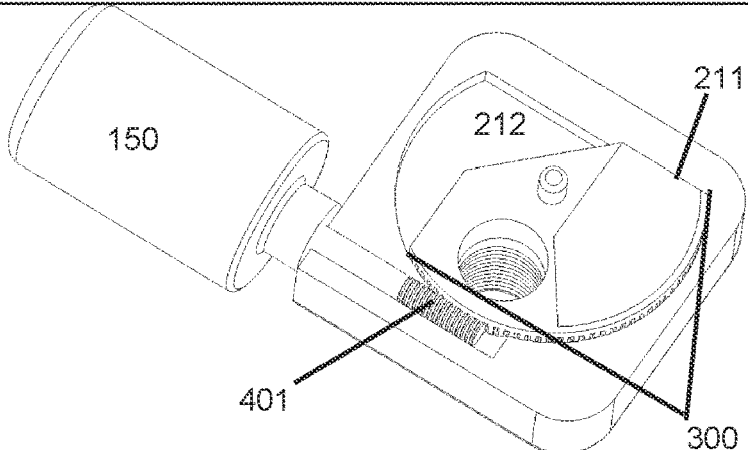
Figure 6E:
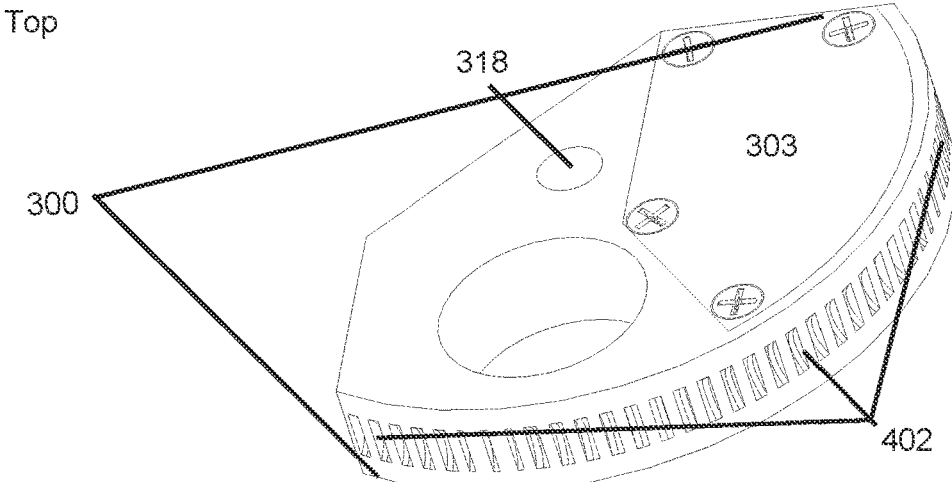
Figure 6F:
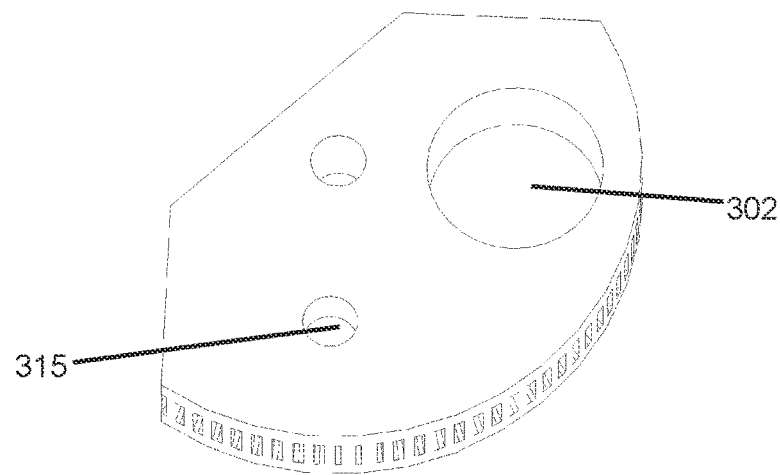
Figure 6G:
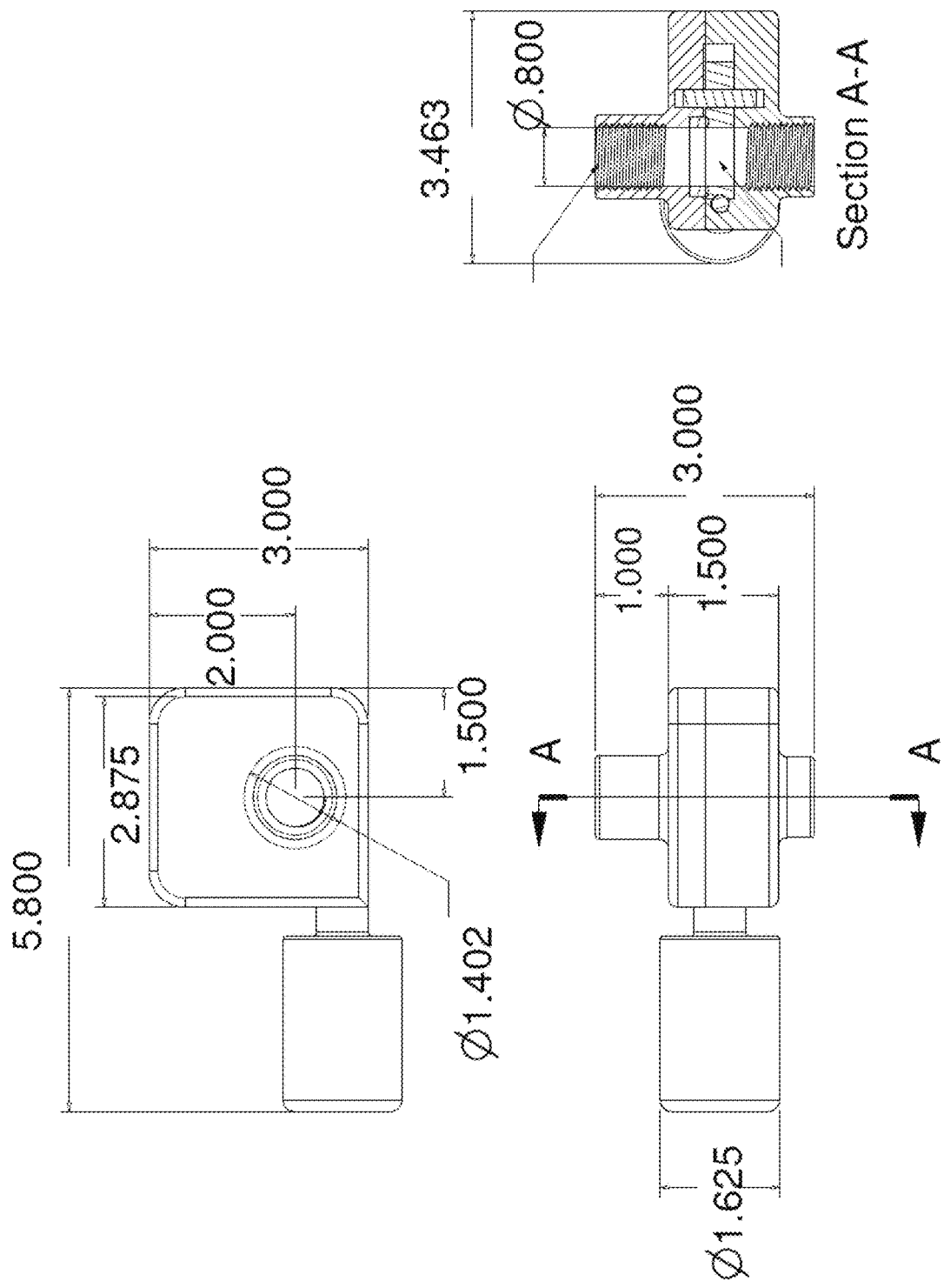

FIG. 6A illustrates an example valve housing exterior of a motorized pivot valve. FIG. 6B illustrates the example embodiment of the pivot valve of FIG. 6A in an open position. FIG. 6C illustrates the example embodiment of the pivot valve of FIG. 6A in a closed position. FIG. 6D illustrates an example pivot membrane assembly, motor, and linkage. FIGS. 6E and 6F illustrate example top and bottom views of an example membrane assembly of the motorized pivot valve of FIG. 6A. FIG. 6G illustrates various views and example exterior dimensions of the motorized pivot valve of the motorized pivot valve of FIG. 6A.

FIGS. 7A-7D illustrate an example valve control circuit and control states.

Figure 8D:
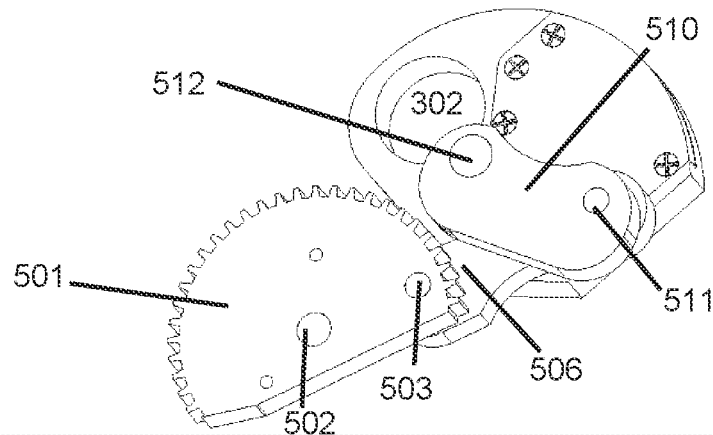
FIGS. 8A-N illustrate an example another example motorized pivot valve, an example motorized pivot valve bar linkage and membrane assembly and example dimensions, an example circuit board assembly and positioning for the example motorized pivot valve, example motorized pivot valve wet and dry chambers, and example motorized pivot valve exterior dimensions.
Figure 8E:
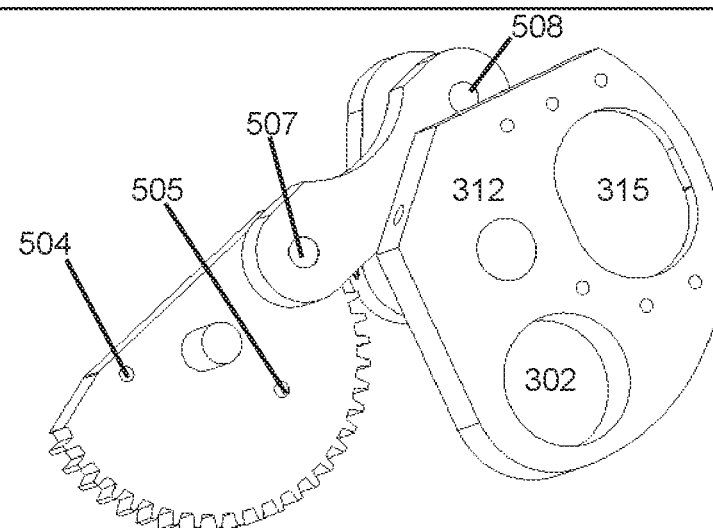
Figure 8F:
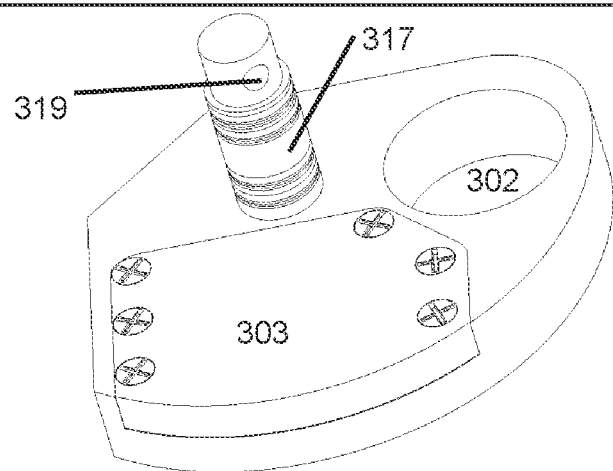
Figure 8G:
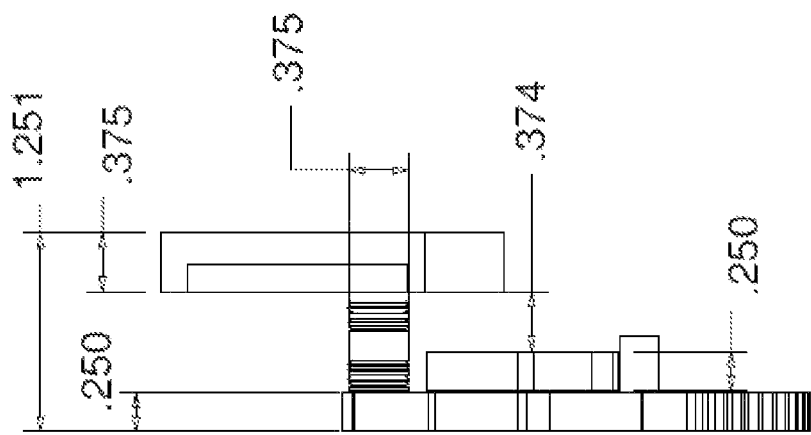
Figure 8G:
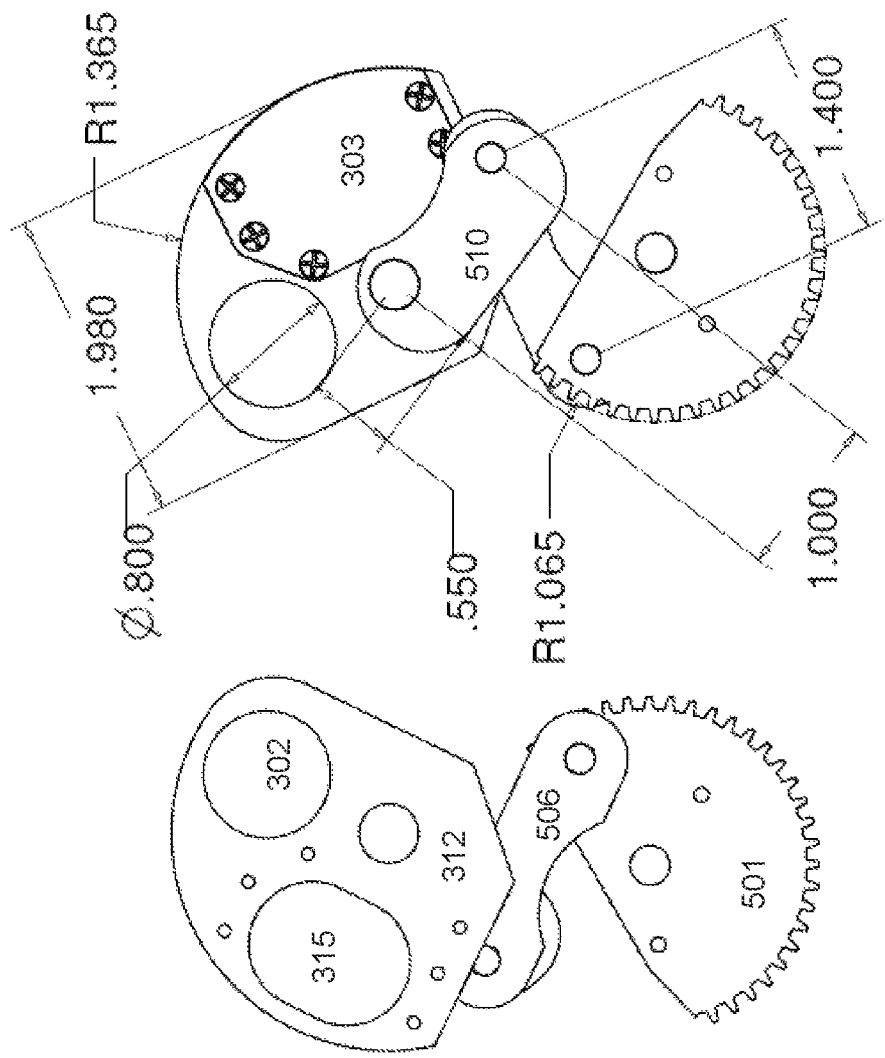
Figure 8K:
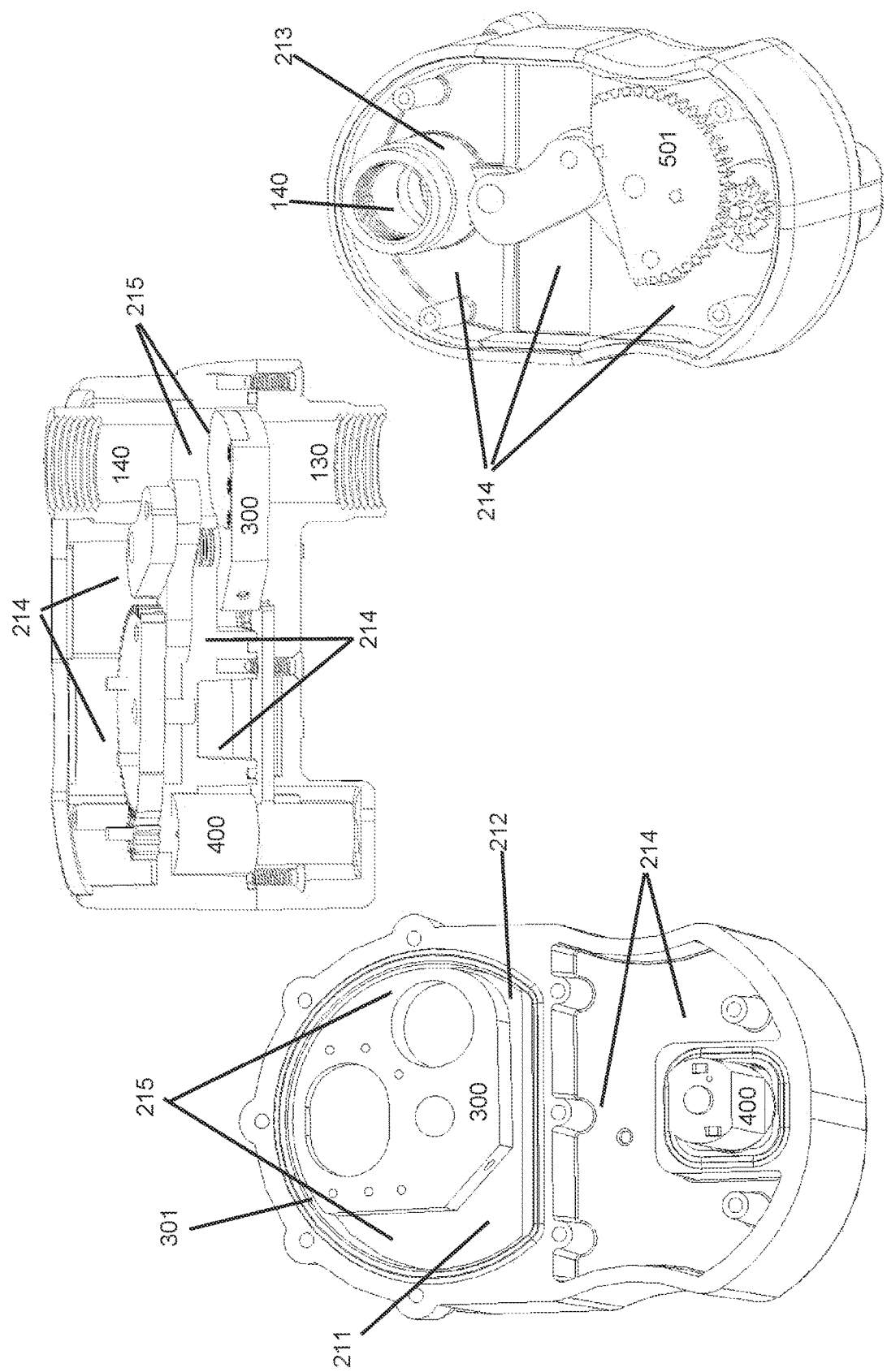
Figure 8L:
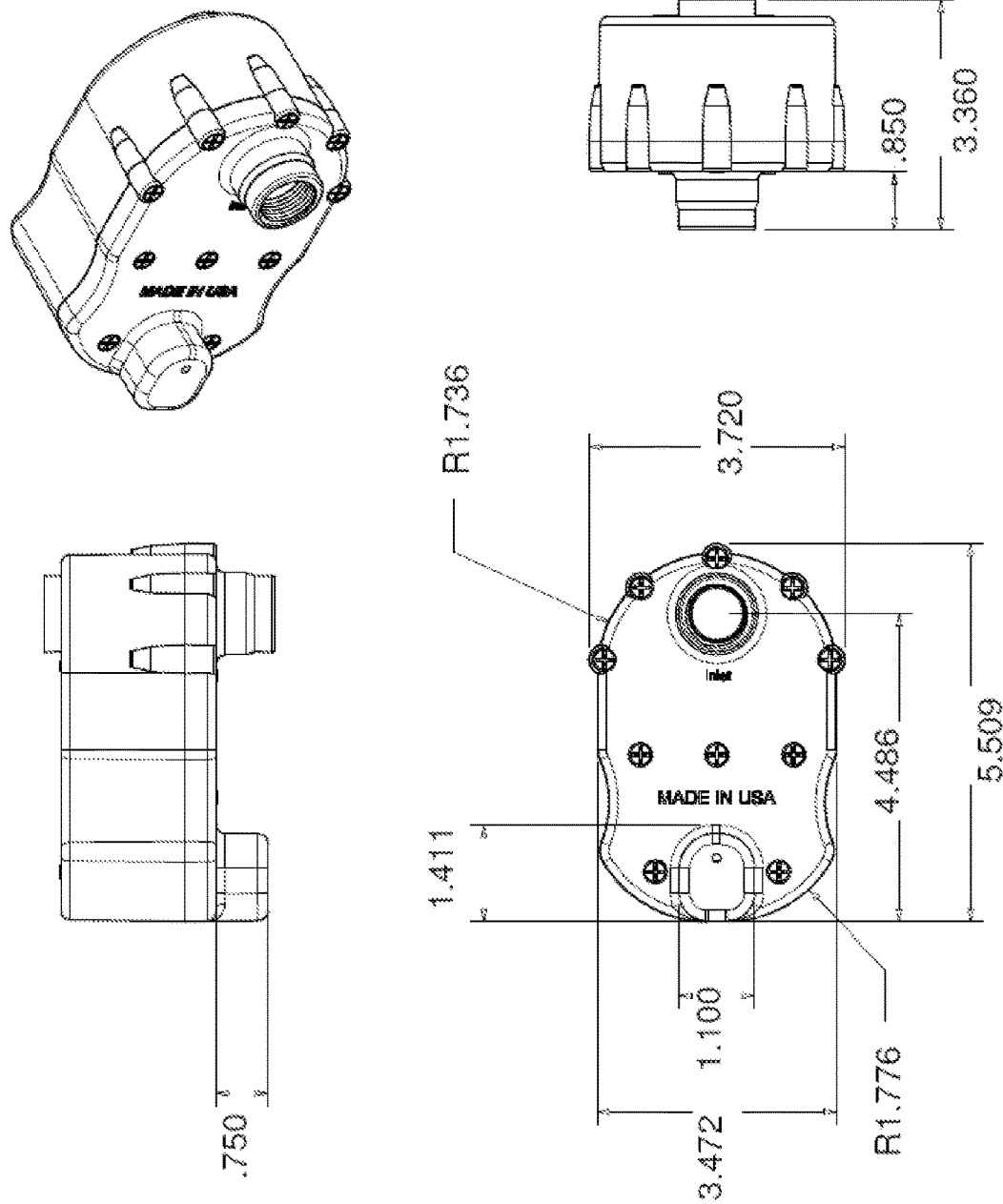

FIG. 8A illustrates an example valve housing exterior of another embodiment of a motorized pivot valve. FIG. 8B illustrates the example embodiment of the motorized pivot valve of FIG. 8A in an open position. FIG. 8C illustrates the example embodiment of the motorized pivot valve of FIG. 8A in a closed position. FIG. 8D illustrates an example linkage top view. FIG. 8E illustrates an example linkage bottom view. FIG. 8F illustrates an example membrane assembly. FIG. 8G illustrates various view and example linkage dimensions of the motorized pivot valve of FIG. 8A. FIG. 8H illustrates an example bottom view of a circuit board used to mount circuit control components for the motorized pivot valve of FIG. 8A. FIGS. 8I, 8J illustrate circuit board positions. FIG. 8K illustrates a moisture barrier and wet and dry cavities for the motorized pivot valve of FIG. 8A. FIG. 8L illustrates various views and example exterior dimensions of the motorized pivot valve of FIG. 8A.

FIG. 9 illustrates an example electrical circuit that may be used with the motorized pivot valve of FIG. 8A.

In FIGS. 1A-4H, 6A-6G and 8A-8N, the example embodiments include two chambers 211 and 212 where the membrane assembly 300 reciprocates to open, close or regulate fluid flow passing from the inlet 130 to the outlet 140. The inlet 130 in certain example embodiments has on orifice (e.g., a threaded orifice) configured to be coupled with a fluid supply conduit, where the inlet 130 has a passageway that communicates fluid from the supply conduit to an orifice that opens up to a valve chamber. Similarly, the outlet 140 in certain example embodiments has an orifice (e.g., a threaded orifice) configured to be coupled with a output conduit (e.g., connected to a sprinkler system or other destination), where the inlet 140 has a passageway that communicates, via an orifice that opens to the valve chamber, fluid from the valve chamber to the output conduit.

In FIGS. 1A-4H, 6A-6G and 8A-8N, the membrane assembly has a passage 302 where fluid passes through the membrane assembly 300 as it travels through the valve. In FIGS. 5B-D the carrier assembly 300 is shortened (relative to the examples in FIGS. 1A-4H, 6A-6G and 8A-8N) so that fluid travels around the side of the assembly rather than through it.

Optionally, the example membrane assemblies have a debris vent 315 which allows excess debris to spill out of the vent rather than accumulate in the floating space 313 or between the membrane 303 and the support 312. This debris vent may be small or so large that virtually the entire membrane 303 is exposed toward the inlet 130 side of the valve, to minimize entrapment between the membrane 303 and membrane support 312.

Optionally, where there is a passage 302, a radius or flow guide 316 (as illustrated in FIG. 4E) may be added to the fluid entrance or bottom side of the assembly 300 to reduce turbulence. Optionally, a protrusion or flow guide may be added to the inlet side 130 of the valve to reduce fluid turbulence and minimize pressure loss.

The figures depict the example geometry and orientation of the membrane assembly 300 with respect to the closure seat 100. This enables the assembly 300 and membrane 303 to align and seal with the valve seat 100. Optionally, the seat 100 is mostly parallel and opposingly faced to the impermeable, compressible and/or flexible and/or stretchable membrane 303 which is mounted on top of membrane assembly 300 to a membrane support 312 that accommodates fastening two or all four sides of membrane 303 to the membrane assembly 300. Optionally, the membrane 303 may be attached on just one side, where all other sides (3 other sides when in the shape of a rectangle or square) are not fastened or do not require fastening.

Sealing is achieved on the downstream side of the valve, between 303 and 100. This single sealing interface in this example (on the downstream side versus sealing both downstream and upstream) utilizes the pressure delivered from inlet 130 (which has an orifice configured to be coupled to a conduit and a fluid passageway to an interior orifice communicating with the valve chamber) to hold the valve closed. The disclosed examples embodiments have a mostly laminar fluid flow path, minimizing pressure loss, however pressure loss and flow control can be achieved by partially opening or closing the valve or by achieving a partial seal between the seat 100 and the impermeable, compressible and/or flexible and/or stretchable membrane 303.

Many membrane 303 shapes may be utilized, including two-dimensional shapes (e.g., square, rectangle, triangle, hexagon, pentagon, oval, octagon) and many three-dimensional shapes (e.g., cube, cuboid, strip, sphere, cone, cylinder). The membrane shape may be selected to accommodate different pressures, membrane densities, membrane durometers, valve sizes, shapes, and designs. Optionally, as dimensions of the membrane 303 change, the mating surfaces of seat 100 will also change to accommodate a seal. To clarify, there are other options than just a flat sealing closure for the valve, and these may include slight convex or other three dimensional mating surfaces between the membrane and the outlet seat 100.

Referring again to FIGS. 1A-3I, embodiments of controllable fluid output control valves and example designs are described whereby different example methods are used to actuate the valve. In the illustrated examples, the membrane assembly 300 has a piston shape and can function like a piston. As described below, an open state enables fluid to flow from the inlet to the outlet, while a closed state prevents flow.

As illustrated, a membrane assembly 300 has two ends 304 and 305, and a solid element (membrane support 312) connecting/attaching the ends 304, 305. The space between the ends is where fluid pressure is exposed to the inner surfaces 310 and 311 of piston ends 304, 305. The membrane 303 is affixed to the assembly 300 adjacent to the inner surfaces 310 and 311 of the piston ends, but other membrane positions and attachment methods may be utilized. In this example, each piston end 304, 305 incorporates O-rings 301 for sealing inside the cylindrical valve chambers 211 and 212, but other sealing methods may be used. Optionally, no sealing members are provided.

To open the valve, the piston assembly is positioned to the right (into chamber 212) so that the closure seat 100 is above the membrane assembly passage 302 (see, e.g., FIG. 2B). To close the valve, the portion of the membrane 303 opposite the membrane assembly passage 302 and adjacent to the inside of the piston inner surface 311 is positioned next to the seat 100. The pressure forces from the inlet 130 side position the membrane 303 against the closure seat 100, closing off fluid flow from outlet 140. The assembly stops at the end of a transition by its inner ends 310 and 311 running into and stopping at the protruding closure seat 100. In this example, the primary sealing materials are the membrane 303 and the two O-rings 301 around piston ends which are in contact with chambers 211 and 212.

During cold weather, to allow residual fluids to expand without damaging components, and or to allow fluids to drain, the valves may be optionally configured with one or many orifices/holes 306 in one or both piston ends. These holes (e.g., circular holes, 1/64 inch to 1/2" inch in diameter), extend from the inside to the outside of the piston ends, from outer surfaces 304 and 305 to inner surfaces 310 and 311 respectively. Further to this example embodiment, flexible flap(s) (e.g., a rubber flap) are optionally configured in association with the perforations to form one or more unidirectional valves 308 and 309. Optionally, the direction of flow through these valves is from the outer surfaces of piston ends 304 and 305, to the inner surfaces 310 and 311 respectively. When the inside of the valve is pressurized from inlet 130, these flaps remain closed or mostly closed, even when fluid pressure, to pilot the valve, is delivered from ports 210 and/or 220.

Fluid pressure on the inner surfaces 310 and 311 of the piston assembly is sufficient to keep these flaps closed and allow pressure on the outer surfaces of the piston ends 304 and 305 to position the piston assembly 300 in a respective direction. When a fluid system is turned off, the pressure delivered to inlet 130 drops, and the valve drains of fluid from the inlet 130 and/or the outlet 140, and a void may appear in the inner cavity of the piston, between piston ends 310 and 311. Chambers 211 and 212 however may be less able to drain, but perforations 306-307 (e.g., FIGS. 1D, 1F) may be provided that allow fluid to percolate through and into the cavity of the piston, between the inner surfaces 310 and 311 of the piston ends.

FIGS. 1B-F and 3B-3H depict a symmetrical membrane assembly 300, with both pistons ends (with outer surfaces 304 and 305) the same diameter. This balances fluid pressure forces on the piston assembly insides which reduces forces needed to move the piston assembly. The valve body includes two optionally equal diameter chambers 211 and 212 where the piston assembly 300 reciprocates to open or closed positions. To open the valve in FIGS. 1B-F, pressure is applied via port 210 while port 220 is simultaneously vented. To close the valve, pressure is applied via port 220 while port 210 is simultaneously vented. The valve in FIGS. 1A-F is optionally operated with a 4-way pilot valve.

FIGS. 2A-F depict an example asymmetrical membrane assembly 300, with a piston end having an outer surface 304 and inside surface 310 with a larger diameter than the opposite piston end with outer surface 305 and inner surface 311 (see, e.g., FIGS. 2D-2F), which generates internal fluid forces, supplied from the inlet 130, to move the piston. The valve housing/body includes, in this example, two different diameter chambers, where chamber 211 is larger than 212. Each piston end incorporates O-rings 301 for sealing inside the cylindrical valve chambers 211 and 212, but other sealing methods may be used. To open the valve, pressure is applied via port 210 and into chamber 211. To close the valve, chamber 211 is vented via port 210 and the internal forces on the piston force the valve shut.

The ratio of diameters is selected to ensure sufficient closing force but to not make it so that the pilot pressure at port 210 must exceed the inlet 130 pressure of the valve. Typically, this ratio is optimal with a diameter ratio of the open/close piston at about 1.3:1, and the ratio for the piston area would be about 1.8:1, but it may range upward or downward (e.g., by 1% to 30%). In this example, just one end of the piston is perforated 306 (see, e.g., FIGS. 2D-F) with a one-way valve 308. This one-way valve 308 is on the inner surface 310 of the piston end. This valve is operated with a 3-way pilot valve. A visual indicator 160 may be affixed to or engraved/molded into piston end outer surface 305 to assist an operator in determining whether the valve is open or closed.

Certain aspects will now be described in greater detail with reference to FIGS. 3A-8N. The example illustrated valve has certain structures as similarly discussed above, such as an inlet 130, and outlet 140, chambers 211 and 212, membrane assembly 300, an impermeable, compressible and/or flexible and/or stretchable membrane 303.

As illustrated, an electric motor 400 drives an actuator which moves the membrane assembly 300. Optionally, said actuator may be a leadscrew 401 which engages the assembly at a female member 402 (see, e.g., FIG. 3F).

FIGS. 3A-H depict a piston style membrane assembly 300 where the power consumption may be, in an example embodiment, approximately 0.7 amps for 18 seconds at 6 VDC, or 4.2 watts, or 76 watt-seconds to switch between On/Off or Off/On. This embodiment may be modified to utilize asymmetrical piston ends which can enable the motor power requirements to be reduced in one direction.

FIGS. 4D, E illustrates an example flow guide 316 with slanted walls at an extended partway into the passage 302 (on inlet side 130) entrance to advantageously reduce turbulence and pressure losses. The flow guide 316 may be utilized with other embodiments disclosed herein.

The example membrane assemblies illustrated in FIGS. 4B-6F and 8B-F do not have piston ends, and as a result requires less precision, less power, and the valve's internal members are less vulnerable to abrasion as compared to embodiments with piston ends.

In the embodiments illustrated in FIGS. 4A-5F and 8A-N fluid is kept from the electronic components by a moisture barrier 213 (see, e.g., FIG. 4G) to thereby prevent the shorting out or other malfunction of the electronic components.

The embodiment illustrated in FIGS. 5A-F is similar to that illustrated in FIGS. 4A-H, however the membrane assembly 300 utilized in the embodiment of FIGS. 5A-F is significantly shorter (e.g., approximately half the length) than that illustrated in FIGS. 4B-G. In addition, the embodiment illustrated in FIGS. 5A-F does not utilize the membrane assembly passage 302 and chamber 212, and this absence simplifies manufacturing, enables a lower cost, and may result in a smaller valve. Fluid travels around the side of the assembly rather than through the passage 302 as in certain other embodiments discussed above. A guide 317 (see, e.g., FIG. 5C) for the membrane assembly may optionally be used to ensure proper alignment with the closure seat 100, but such a guide is not required. The leadscrew 401 illustrated in FIG. 5C may engage the assembly 303 at a female member 402 (see, e.g., FIG. 5D). While not illustrated in this drawing, electronic control can be achieved using similar techniques as illustrated in as illustrated in FIGS. 3A-H and/or FIGS. 4A-G, and/or FIG. 9.

Referring now to FIGS. 6A-G, the illustrated example valve employs sliding rotary movement of the membrane assembly 300. As similarly discussed with respect to certain other embodiments, this embodiment of the valve includes a motor, an inlet 130, and outlet 140, a rigid, and an impermeable flexible and/or stretchable and/or compressible membrane 303 and rigid seat 100. The illustrated embodiment of FIG. 6E includes a worm drive 401 and a worm wheel 402.

The example membrane assembly 300 in this example is in the shape of a partial disk and has a pivot shaft 317 and bearing 318 where the assembly 300 is mounted and rotates. The membrane assembly 300 rotates (under control of the motor 150) partially from side to side to open or partially close the valve, wherein the membrane assembly 300 is rotated by the motor 150 to slide over the outlet orifice that protrudes into the valve chamber to close the valve, and wherein the membrane assembly 300 is rotated by the motor 150 to slide away from the outlet orifice that protrudes into the valve chamber to open the valve. Optionally, a full rotation of 360 degrees may be implemented.

A typical application using an example embodiment may consume approximately 1.2 amps for 2 seconds at 6 VDC, or 7 watts and 14 watt-seconds to switch between On/Off or Off/On. Electronic control can be achieved using similar techniques as illustrated in FIGS. 3-4 and 7.

Figure 7A:
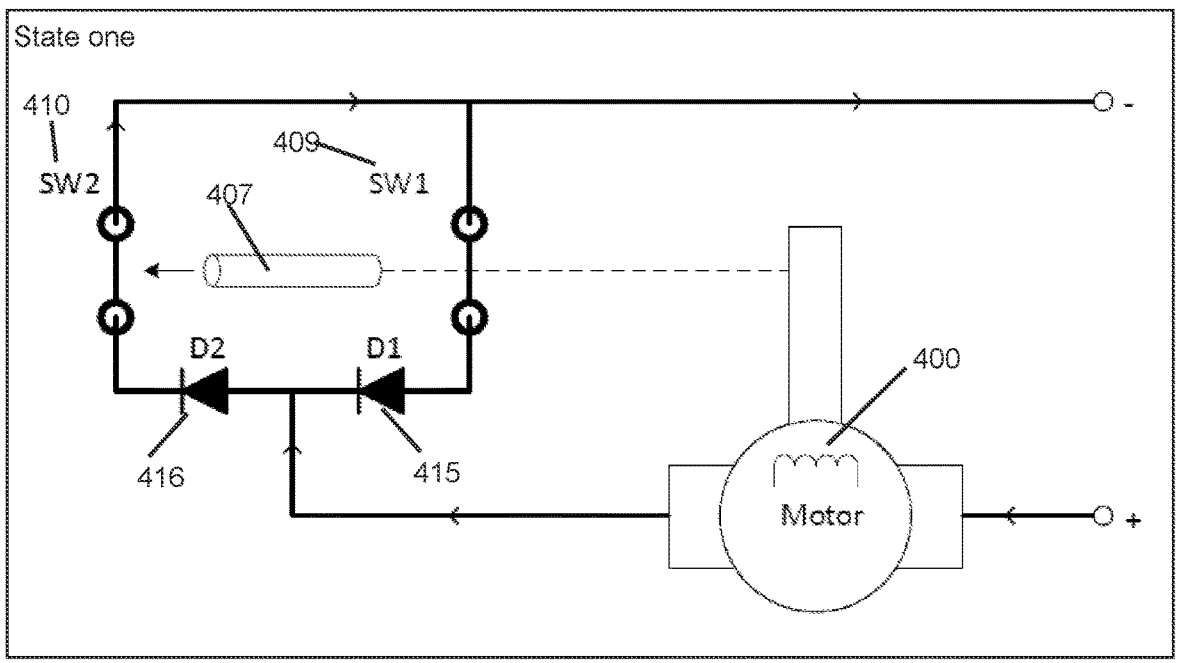
FIGS. 7A-D illustrate an example electrical circuit for FIGS. 3-6.
Figure 7B:
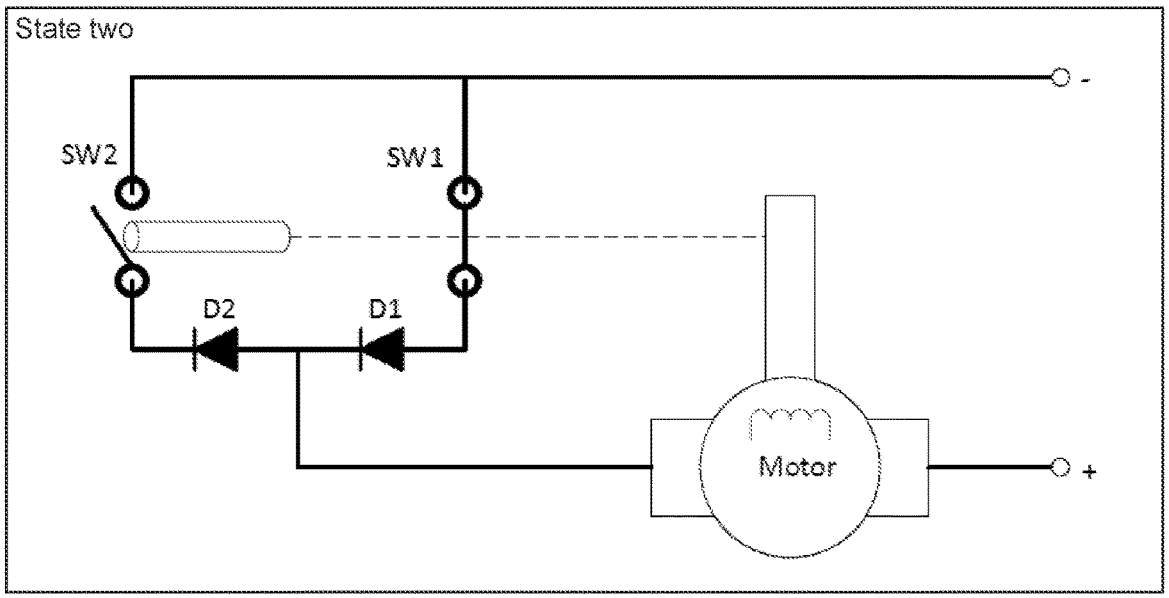

Example electronic control components of valves illustrated in FIGS. 3A-6G are detailed in various figures therein. Actuating force is provided by a motor 400 which is mechanically connected to the membrane assembly 300. Assembly 300 mobilizes devices, such as a rod 403 (see, e.g., FIG. 3G, 4C), that open and close switches 409 and 410 (SW1 and SW2), as illustrated in FIGS. 7A-D which illustrates an electrical valve control circuit which may be utilized with the example valves described above. Rod 403 is aided by a rod guide 404, rod limits 406 and 406, and a switch end 407 (see, e.g., FIGS. 3H, 4G, 7A, 7C). The guide 404 ensures the rod 403 is properly aligned with the switches 409 and 410. The rod limits 405 and 406 act as a latching mechanism to keep the switch end 407 in the appropriate position in relation to switches 409 and 410 (SW1 and SW2). As illustrated in FIGS. 7A-B, this example circuit is comprised of two normally closed single pole single throw (SPST) switches 409 and 410 (SW1 and SW2) along with two diodes 415 and 416 (D1 and D2); alternatively, as illustrated in FIG. 3H, one single pole double throw (SPDT) switch 411 may be utilized to replace the two SPST switches 409, 410.

FIGS. 7A-D illustrate operational states one through four for the embodiments in FIGS. 3A-6G. The motor direction is controlled by the DC polarity, where changing polarity opens or closes or controls the valve. In State one (as illustrated in FIG. 7A), which is the initial starting condition for purposes of illustration. where both limit switches 409 and 410 are closed and the valve is either open or closed. To transition from state one, DC current is applied in the polarity as shown and flows through switch 410 (SW2) via diode 416 (D2) to actuate the motor 400 to move the valve rod 403 toward the desired position. When the valve rod 403 reaches the desired position, switch 410 (SW2) opens to stop the motor.

Figure 7C:
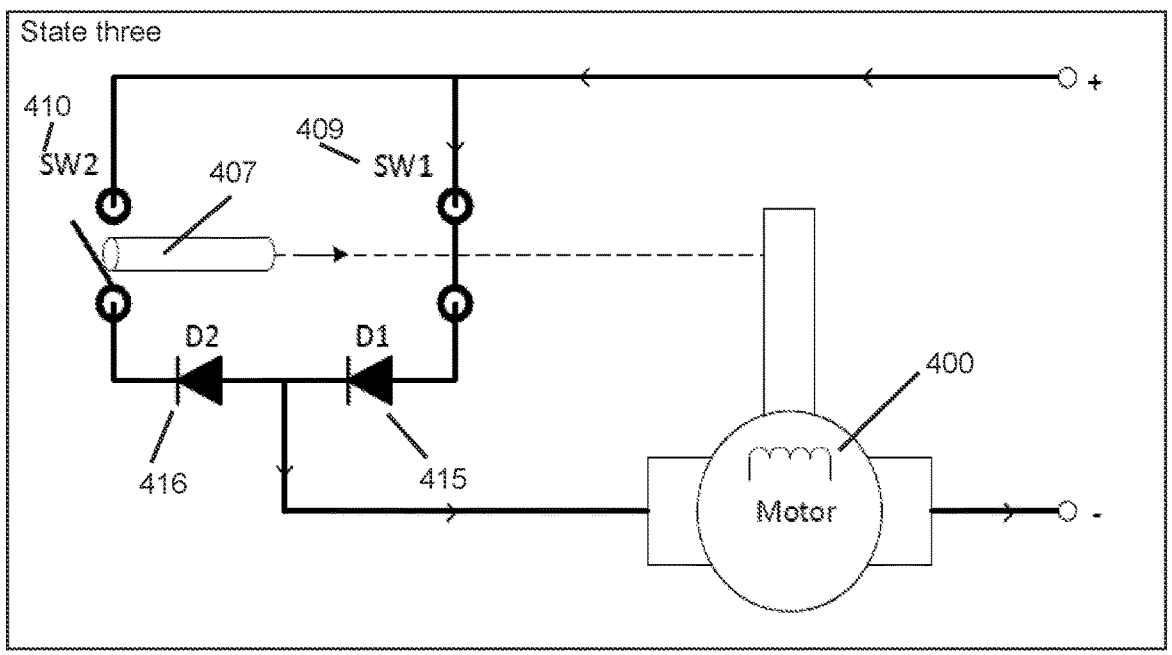
Figure 7D:
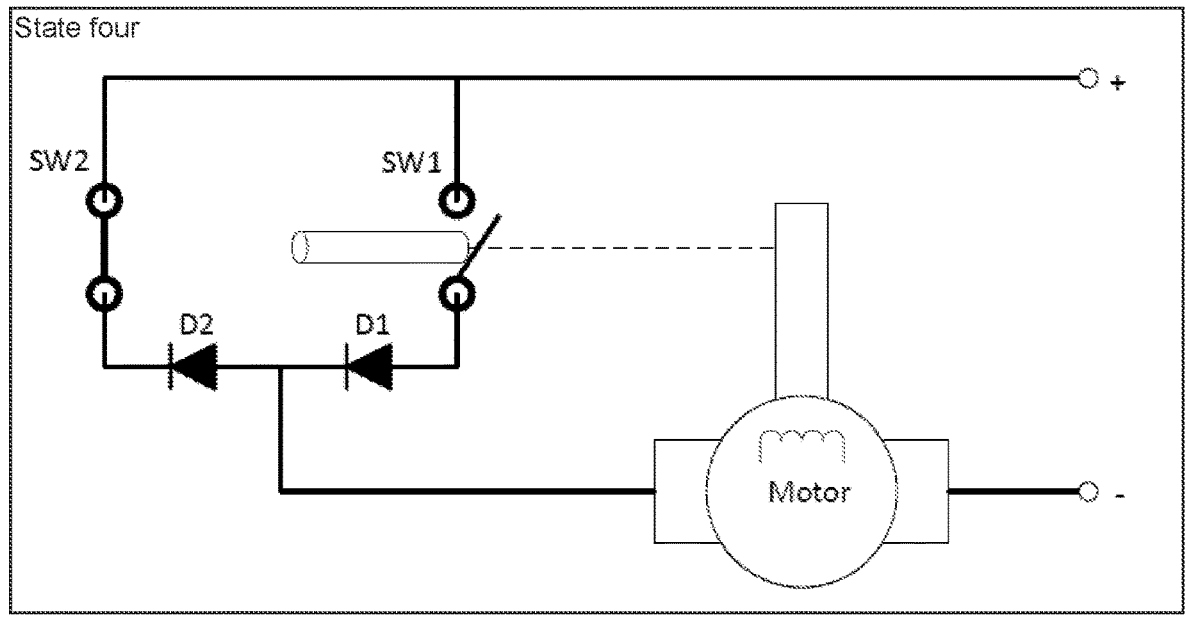

State one is functionally identical or similar to state four (as described herein) when the polarity of state one is applied. In state two (as illustrated in FIG. 7B), the motor 400 and valve remain stationary and no current is flowing. To transition from state two, the DC polarity is reversed and current flows through switch 409 (SW1) and diode 415 (D1), causing the motor 400 to reverse direction. In state three (as illustrated in FIG. 7C), switch 409 (SW1) opens to stop the motor 400, and switch 410 (SW2) is closed, where the valve can be in either an open or closed position. To transition from state three to state four (as illustrated in FIG. 7D), the motor 400 and valve remain stationary and no current is flowing. In state four, switch 409 (SW1) is open and switch 410 (SW2) is closed. To transition from state four to state one, the DC supply power polarity is reversed. Other circuits and devices may be utilized to power and control the valves.

Certain aspects will now be described in greater detail with reference to FIGS. 8A-9 which illustrate valves and valve components for another example embodiment of a motorized pivot valve that controls fluid flow between the inlet 130 and the outlet 140 (which may optionally be threaded, and may have orifices and passageways as similarly discussed above and as illustrated in FIG. 8K). It is understood that design alternatives and substitutions are possible. As will be discussed, a multi-link mechanism may be utilized to close and open the valve by pivoting an impermeable, compressible and/or flexible and/or stretchable membrane to slide over an outlet seat.

The disclosed example shape and tolerances of the membrane assembly 300 offer certain significant advantages. Use of a relatively thinner membrane support 312 (see, e.g., FIG. 8E) enables debris to more freely pass by the assembly. An adhesive may be utilized to attach a membrane 303 (e.g., an impermeable, compressible and/or flexible and/or stretchable membrane) to the support 312. Thus, the membrane 303 may be flexible prior to being adhesively attached to the support 312, but once attached, the backside of the membrane 303 may now be rigid, and the front of the membrane 303 may remain impermeable, compressible and/or flexible and/or stretchable.

Eliminating the optional debris vent 315 illustrated in FIGS. 8E, 8G while also using an adhesive to attach the membrane 303 (see, e.g., FIG. 8F) to the support 312 aids in preventing debris migration between the two elements. The example embodiments illustrated in FIGS. 8A-9 have relatively tight tolerances (e.g., in the range of 0.002 to 0.005 inches) between the membrane assembly 300 and the surrounding chambers 211 and 212 (see, e.g., FIG. 8K) in which the assembly rotates, which is designed to prevent debris from migrating into chambers 211 and 212. Alternatively, debris may be allowed to migrate into said chambers with wider gaps such as 0.01 to 0.25 inches between the assembly and the surrounding chambers to avoid jamming. A motor housing 150 may optionally be a non-metal housing.

With reference to FIGS. 8B-8E, a motor 400 and pinion 500 drives a gear 501, the gear 501 in this example being the first bar in a planar four-bar linkage, where the bars may be pivotally coupled. For example, the four-bar linkage may comprise four links connected by four one-degree-of-freedom joints (e.g., a hinged or sliding joint). Motor and actuation rotation are parallel to reciprocating closure elements and sealing outlet.

The second bar 506 is connected to the third bar 510, and the fourth bar is the membrane assembly 300. The gear 501 pivots at a pivot at location 502, and is connected to the second bar 506 at pivots located at points 507 and 503, where the links rotate/pivot freely. The second bar 506 is attached to the third bar 510 at pivot points 508 and 511, where the links rotate/pivot freely. Bar 510, via pivot point 512, is linked to the membrane assembly 300 via the assembly's pivot shaft 317. The shaft 317 is fixed at point 319 and does not rotate freely in this example.

With reference to FIG. 8K, the valve includes a dry cavity 214 and a wet cavity 215, where the wet cavity 215 is exposed to the fluids which pass through the valve. Optionally, the primary moving part inside the wet cavity 215 is the membrane assembly 300 and its rotating shaft 317. A continuous moisture barrier 214 made of the same material as the valve housing and integral to the housing structure divides the wet cavity 215 and the dry cavity 214.

Figure 8M:
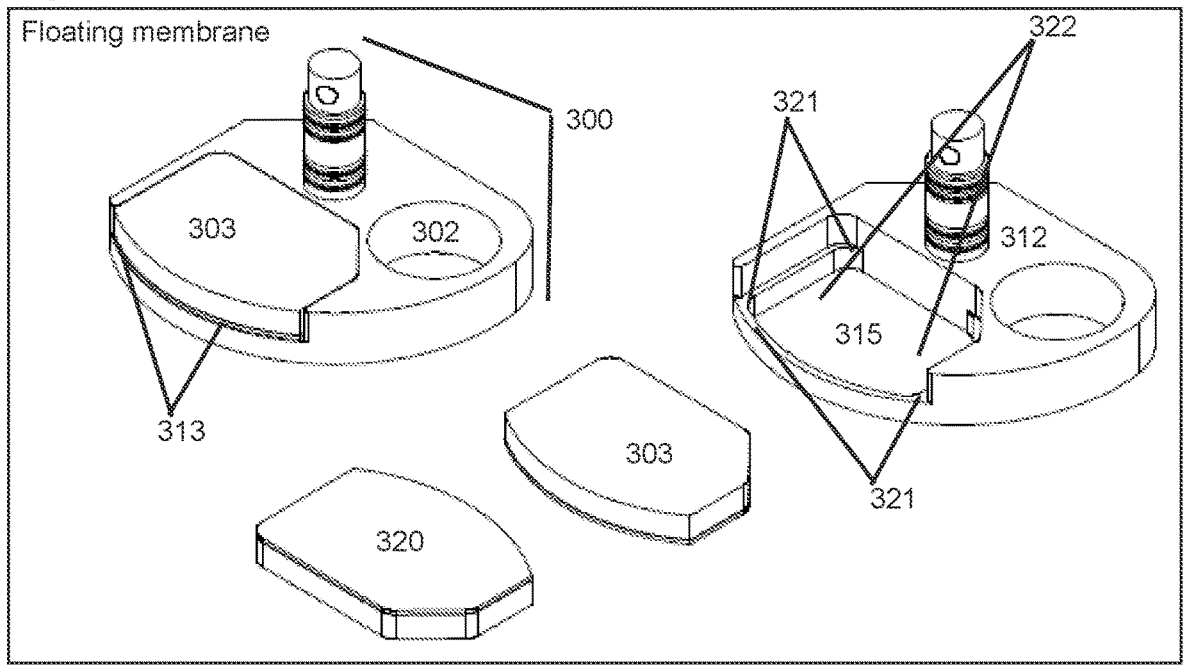
Figure 8N:
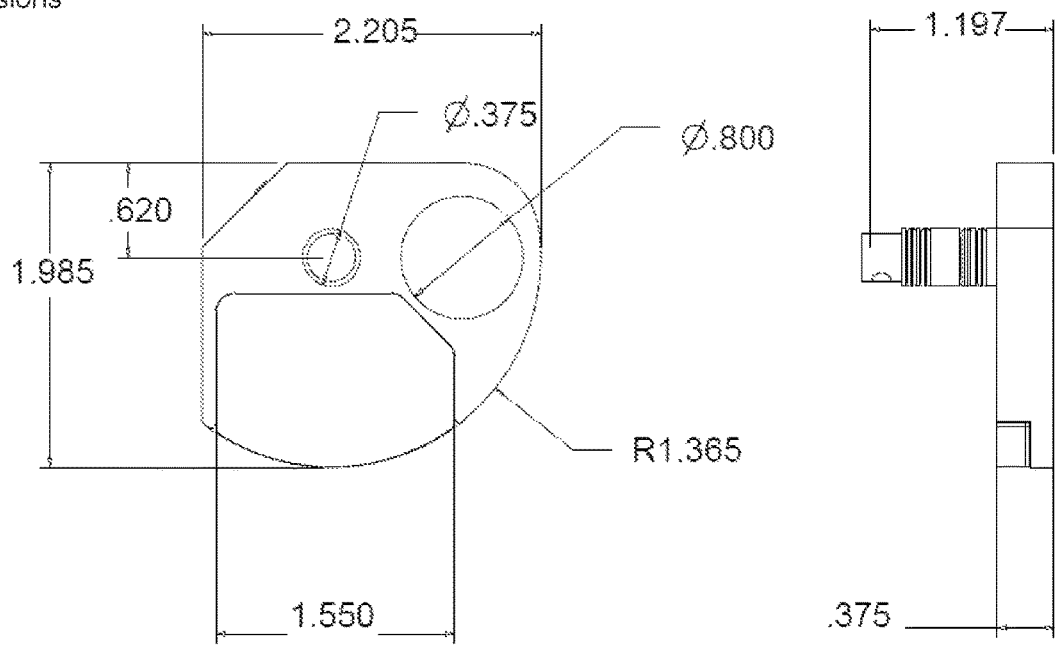

The linkage mechanism transfers power and movement from the motor 400 to open, close, or control the motorized pivot valve of FIGS. 8A-N. A benefit of this multi-bar linkage is that it delivers variable torque (with reduced power requirements at switching points), with the greatest torque at both end points of open or closed. Where valve stiction is greatest, as the motor initiates the move from valve closure towards an open state, this linkage produces torque so great that it is difficult to calculate. This enables a small motor (e.g., about 1.5 W, approximately 5 cm long by 2 cm in diameter) to easily overcome stiction when opening the valve and overcoming the fluid pressure holding the valve closed. Conversely, this variable torque provided by the linkage assembly adds speed to the movement of the membrane assembly between closed and open positions, after stiction is overcome.

Example dimensions of an embodiment of the bar linkage are provided in FIG. 8G. These dimensions enable the disclosed torque and mechanical advantages as well as variable torque and mechanical advantages (although other dimensions may be utilized). The mechanical advantage of the example linkage and gear system is approximately 60-70 at the points before and after valve closure, where stiction is greatest and this advantage is needed most, and 9-10 before and after valve opening. In an example embodiment, at a fluid pressure of 90 psi, the motor torque required in and around the closed position of the valve will be approximately 4.0-6.0 ozf-in (ounce force inch) where mechanical advantage from the linkage and gears of approximately 60-70, and around the open position the motor torque required would be approximately 32-34 ozf-in with mechanical advantage from the linkage and gears of approximately 8-12, and the peak torque requirement (near midpoint between open and close) would be approximately 80-100 ozf-in. with a mechanical advantage of 3-5 where movement speed is greatest.

An example circuit board and electrical control circuit are illustrated in FIGS. 8H-I and 9. A snap action mechanism (sometimes referred to as bistable, over-center, or tipping-point mechanism) ensures improved precision time switching of the SPDT reed switch 611. As the gear 501 rotates back and forth, switch triggers 504 and 505 protruding from the gear tilt a latching lever 601 which is attached to a spring 612. The spring 612 is attached to the swinging side 603 of the latching lever 601 which pivots at the opposite end 602. The spring 612 is attached via attachment mechanism 606 (e.g., a hook, pin, screw, or rivet) to the pivoting point of a second latching lever 605 which has a magnet attached to its swinging end 607. The magnet 610 actuates a SPDT reed switch that serves to stop a DC motor once DC voltage has been applied at various times in reversing polarity. This snap action mechanism accelerates and standardizes the positioning and timing of the magnet in the triggering proximity (activation distance) of the reed switch. The snap action also broadens the AT (amp turns) range of the reed switches and magnet strengths, further reducing costs. A SPDT reed switch enables the use of a single switch versus two SPST switches as discussed with respect to FIGS. 7A-D. Optionally, in addition to or instead of a reed switch, a limit switch may be used.

FIG. 9 illustrates an example electrical control circuit that optionally can be used to control the valves illustrated in FIGS. 6A-G and 8A-N. The motor direction is controlled by changing DC polarity which opens, closes, or controls the valve by moving the membrane assembly from one side to another to open or close the valve. An advantage of this optional method and circuit is that it uses just one single pole double throw (SPDT) reed switch versus two SPST switches, which minimizes complexity. This circuit and method of motor control, which engages the switch contacts only to disconnect power from the motor, also eliminates exposure of the switch contacts to inrush current from the motor and minimizes arcing between the contacts which may extend the life of the switch considerably. Various components (e.g., Zenner diodes) are employed to protect the circuit and components from incoming surges as well as to further protect components from inductive energy when the motor is switched off.

Another optional advantage with respect to the example circuit is that electrical switching occurs only when the valve has completed a "close" or "open" movement. Because this is also when the mechanical advantage from this linkage is greatest, the switching contacts are exposed to the least amperage, further extending the life of the switch. For example, in an optional embodiment, at 90 psi and 12 VDC, the system may run peak amps in the range of 500 mA, but when the switching happens the system and switching contacts may see less than 250 mA at or near the open position and less than 100 mA at or near the closed position, where stiction is greatest. Greatest stiction will be when the valve initiates the transition from a closed (no fluid can pass) to open position (fluid passes), and the motor needs to overcome the force (which may be about 90 spi, although higher or lower force may be present) on the membrane 303 against the valve seat 100

FIGS. 8M-N illustrate an impermeable closure membrane 303 that flexes, compresses, stretches and/or otherwise forms a seal is similar to the membrane in FIGS. 8D-F, except the membrane 303 in FIGS. 8M-8N is not attached to the support 312. Optionally, the membrane 303 is attached to a rigid plate 320 with adhesive (without requiring the use of mechanical fasteners, although such mechanical fasteners, such as screws or rivets, may be used in addition or instead). Optionally, the membrane may not have any backing plate and may be constructed of a harder durometer than membranes that utilize a backing plate.

Membrane alignment is partially provided by the membrane assemblies' pivoting arm and membrane assembly structure. Positioning, transitioning, sealing, and unsealing, of the sealing membrane 303 may be driven by a combination or from independent actuating systems, including stretching, flexing, compressing, rocking, sliding, or horizontal movement in relation to the sealing outlet orifice. In this example, horizontal movement of the membrane is employed in contrast to embodiments illustrated in certain other figures.

The membrane 303 and backing plate "float" or move freely within the confines of the membrane support cavity 322 which is within the membrane support 312 structure next to the debris vent 315. The lower limit of floating is defined by the backer support ridges 321 which are optionally integral to and built into the support. The backer support ridges 321 also define how much space is between the membrane 303 and valve seat 100 (which is also the upper limit of the floating space). The length and width dimensions of the membrane are preferably larger than the diameter and/or dimensions of the valve seat, to ensure complete sealing when the valve is closed. This floating is enabled by a membrane and/or membrane with backing plate that are shorter in length and width than the support cavity. As an example, with a ¾" valve the length of the cavity may be 1.550" whereas the length of the membrane 303 and backing may only be 1.500". This difference in dimensions reduces friction between the membrane 303 and membrane backer and the walls of the cavity. This space also minimizes friction between lodged debris such as sand and organic debris that may become lodged or pass through these spaces.

The membrane 303 may be the same or different size as the backing plate, for example, the membrane may hang over the edges of a backing plate by 0-5 mm in a ¾" valve. The backing plate may have a single or multiple holes to modify the structural properties of the membrane backer support ridges 321 under various pressure scenarios as well as during moving or positioning schemes, in order to enable the valve to achieve performance objectives including reduced power requirements, reducing water hammer, and increasing membrane mobility in the cavity and support interface above the debris vent.

The shape of the membrane 303 and backing plate may vary considerably with shapes including those mentioned before for both two dimensional (e.g., circle, rectangle) and three dimensional (e.g., sphere, cube, rectangle). Whichever shape is utilized, a corresponding mating cavity will be present in the membrane cavity, ridges, and debris vent. Additional channels may be added to the membrane support 312 and dimensions may be increased to reduce the amount of debris getting stuck between the support and the surrounding cavity.

The backing plate 320 may be made of one or more of the rigid polymers discussed herein and/or other rigid polymers. The backing plate may be more rigid or less rigid than the membrane 303. If the backing plate is more rigid than the membrane 303, the backing plate stiffness may assist in keeping the membrane from developing ridges and/or other deformities on its surface as it is moved and positioned under pressure to seal with valve seat 100 or positioned off of the seat.

Thus, various valves are disclosed that provide reduced pressure drop, higher reliability, and less susceptibility to debris blockages and wear.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component via another component or directly connected to the second component.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The previous description of the disclosed implementations is provided to enable any person skilled in the art to make or use the present invention. Various modifications to these implementations will be readily apparent to those skilled in the art, and the generic principles defined herein may be applied to other implementations without departing from the scope of the invention. For example, it will be appreciated that one of ordinary skill in the art will be able to employ a number corresponding alternative and equivalent structural details, such as equivalent ways of fastening, mounting, coupling, or engaging tool components, equivalent mechanisms for producing particular actuation motions, and equivalent mechanisms for delivering electrical energy. Thus, the present invention is not intended to be limited to the implementations shown herein but is to be accorded the widest scope consistent with the principles and novel features disclosed herein.

What is claimed is:

1. An irrigation valve, comprising: a housing having an exterior surface and an interior surface, the interior surface defining at least one chamber, the housing having: a fluid inlet defined by a fluid inlet wall, the fluid inlet wall defining a first fluid inlet orifice configured to engage a first fluid conduit, wherein the fluid inlet wall does not extend into the chamber, and wherein the fluid inlet comprises a second fluid inlet orifice defined by the interior surface of the housing, wherein the fluid inlet is configured to communicate fluid from the first fluid conduit via the first fluid inlet orifice to the second fluid inlet orifice, and from the second fluid inlet orifice to the chamber; a fluid outlet defined by a fluid outlet wall and comprising a first fluid outlet orifice and a second fluid outlet orifice, the fluid outlet wall configured to: to engage a second fluid conduit via the first fluid outlet orifice, communicate fluid, via the second fluid outlet orifice, from the chamber to the second fluid conduit; a movable rigid substrate having a first surface and a second surface, wherein the first surface is closer to the second fluid outlet orifice than the second surface; and a compressible and/or impermeable and/or stretchable membrane mounted on the first surface of the movable rigid substrate, wherein the movable rigid substrate is configured to be positioned so that the compressible and/or impermeable and/or stretchable membrane is located between the second fluid inlet orifice and the second fluid outlet orifice when the irrigation valve is in a closed position, and wherein a fluid pressure within the chamber causes the compressible and/or impermeable and/or stretchable membrane to seal the second fluid outlet orifice, and not the second fluid inlet orifice, when the irrigation valve is in the closed position, and wherein the movable rigid substrate is configured to move along a path.

2. The irrigation valve as defined in claim 1, wherein the irrigation valve is configured to partially open or partially close to modify flow rates of fluid flowing through the valve from the fluid inlet to the fluid outlet.

3. The irrigation valve as defined in claim 1, wherein the irrigation valve is configured to partially open or partially close to modify fluid pressure.

4. The irrigation valve as defined in claim 1, wherein the membrane is configured to act in two dimensions.

5. The irrigation valve as defined in claim 1, wherein the membrane is configured to act in two dimensions, the membrane comprising a square, rectangle, triangle, hexagon, pentagon, oval, or octagon shape.

6. The irrigation valve as defined in claim 1, wherein the membrane is configured to act in three dimensions.

7. The irrigation valve as defined in claim 1, wherein the membrane is configured to act in three dimensions, the membrane comprising a cube, cuboid, strip, sphere, cone, or cylinder shape.

8. The irrigation valve as defined in claim 1, wherein the irrigation valve comprises one or more fluid venting ports.

9. The irrigation valve as defined in claim 1, wherein the irrigation valve is configured as a two-way valve.

10. The irrigation valve as defined in claim 1, wherein the irrigation valve is configured as a three-way valve.

11. The irrigation valve as defined in claim 1, wherein the irrigation valve is configured as a four-way valve.

12. A valve, comprising:
- a housing having an exterior surface and an interior surface, the interior surface defining at least one chamber,
- the housing having:
  - a fluid inlet defined by a fluid inlet wall, the fluid inlet wall defining a first fluid inlet orifice configured to engage a first fluid conduit, wherein the fluid inlet comprises a second fluid inlet orifice defined by the interior surface of the housing, wherein the fluid inlet is configured to communicate fluid from the first fluid conduit via the first fluid inlet orifice to the second fluid inlet orifice, and from the second fluid inlet orifice to the chamber;
- a fluid outlet defined by a fluid outlet wall and comprising a first fluid outlet orifice and a second fluid outlet orifice, the fluid outlet wall configured to:
  - to engage a second fluid conduit via the first fluid outlet orifice,
- a movable substrate having a first surface and a second surface, wherein the first surface is closer to the second fluid outlet orifice than the second surface; and
- a compressible and/or impermeable and/or stretchable membrane mounted on the first surface of the movable substrate,
- wherein the movable substrate is configured to be positioned so that the compressible and/or impermeable and/or stretchable membrane is located between the second fluid inlet orifice and the second fluid outlet orifice when the valve is in a closed position, and wherein a fluid pressure within the chamber causes the compressible and/or impermeable and/or stretchable membrane to seal the second fluid outlet orifice, and not the second fluid inlet orifice, when the valve is in the closed position, and wherein the movable substrate is configured to move along a path.

13. The valve as defined in claim 12, wherein the valve is configured to partially open or partially close to modify flow rates of fluid flowing through the valve from the fluid inlet to the fluid outlet.

14. The valve as defined in claim 12, wherein the valve is configured to partially open or partially close to modify fluid pressure.

15. The valve as defined in claim 12, wherein the membrane is configured to act in two dimensions.

16. The valve as defined in claim 12, wherein the membrane is configured to act in two dimensions, the membrane comprising a square, rectangle, triangle, hexagon, pentagon, oval, or octagon shape.

17. The valve as defined in claim 12, wherein the membrane is configured to act in three dimensions.

18. The valve as defined in claim 12, wherein the membrane is configured to act in three dimensions, the membrane comprising a cube, cuboid, strip, sphere, cone, or cylinder shape.

19. The valve as defined in claim 12, wherein the valve comprises one or more fluid venting ports.

20. The valve as defined in claim 12, wherein the valve is configured as a two-way valve.

21. The valve as defined in claim 12, wherein the valve is configured as a three-way valve.

22. The valve as defined in claim 12, wherein the valve is configured as a four-way valve.

* * * * *